United States Patent [19]

Rethwish et al.

[11] Patent Number: 4,642,436

[45] Date of Patent: Feb. 10, 1987

[54] AUTOMATIC METALLIC HONEYCOMB CORE MANUFACTURING MACHINE

[75] Inventors: William F. Rethwish, Bonita; Samuel Schneider, San Diego, both of Calif.

[73] Assignee: Rohr Industries, Inc., Chula Vista, Calif.

[21] Appl. No.: 650,627

[22] Filed: Sep. 14, 1984

[51] Int. Cl.[4] ...................... B23K 11/00; B23K 37/02
[52] U.S. Cl. .................................... 219/78.11; 219/87
[58] Field of Search ...................... 219/78.11, 78.12, 87

[56] References Cited

U.S. PATENT DOCUMENTS

| | | | |
|---|---|---|---|
| 3,077,533 | 2/1963 | Rohr et al. | 219/78.11 X |
| 3,092,711 | 6/1963 | Bennett et al. | 219/78.12 X |
| 3,259,731 | 7/1966 | Poniktera | 219/78.11 X |
| 3,283,118 | 11/1966 | Runkle | 219/78.11 X |
| 4,013,865 | 3/1977 | Jones | 219/78.11 |
| 4,280,039 | 7/1981 | Campbell et al. | 219/78.11 |

Primary Examiner—E. A. Goldberg
Assistant Examiner—Catherine M. Sigda
Attorney, Agent, or Firm—Patrick J. Schlesinger; Frank D. Gilliam

[57] ABSTRACT

A honeycomb core manufacturing machine which includes a mainframe assembly and a transport assembly carried by and translatable along the mainframe assembly. The mainframe assembly comprises vertical and horizontal translatable upper and lower weld electrode assemblies. The transport assembly comprises upper and lower weld wheel electrode assemblies, an upper and lower weld electrode spreader assembly and a corrugated ribbon strip placement mechanism for placing ribbon between the spread apart upper and lower negative weld electrode assemblies with crest and trough of adjacent layers in registry. Sequentially as the transport assembly translates to and fro across the mainframe assembly between discrete weld stations, the upper and lower weld assemblies are spread apart, ribbon is placed between them, they then return to their non-spread apart locations by spring bias holding the corrugated ribbon in a weld position, the upper and lower weld wheel assemblies rotate from their non-weld position to their weld position where they engage and roll across the outer surface of the last placed foil ribbon layer and weld current passes between the weld wheel electrodes and weld electrodes through the adjacent ribbon layers welding them together at their registry, the upper and lower weld wheel assemblies then rotate back to their non-weld position and the same sequence of events is repeated until a sufficient length of core is produced.

13 Claims, 46 Drawing Figures

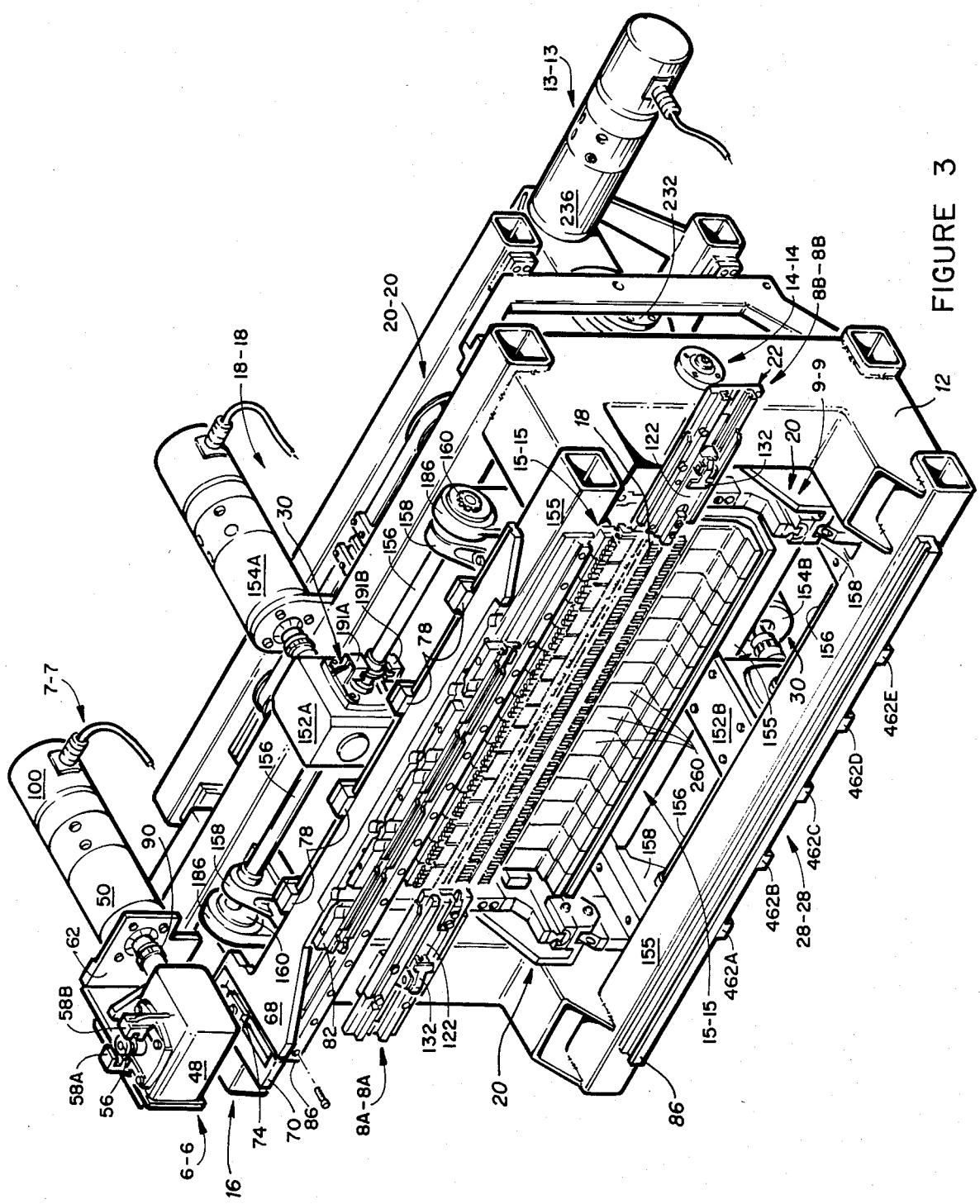

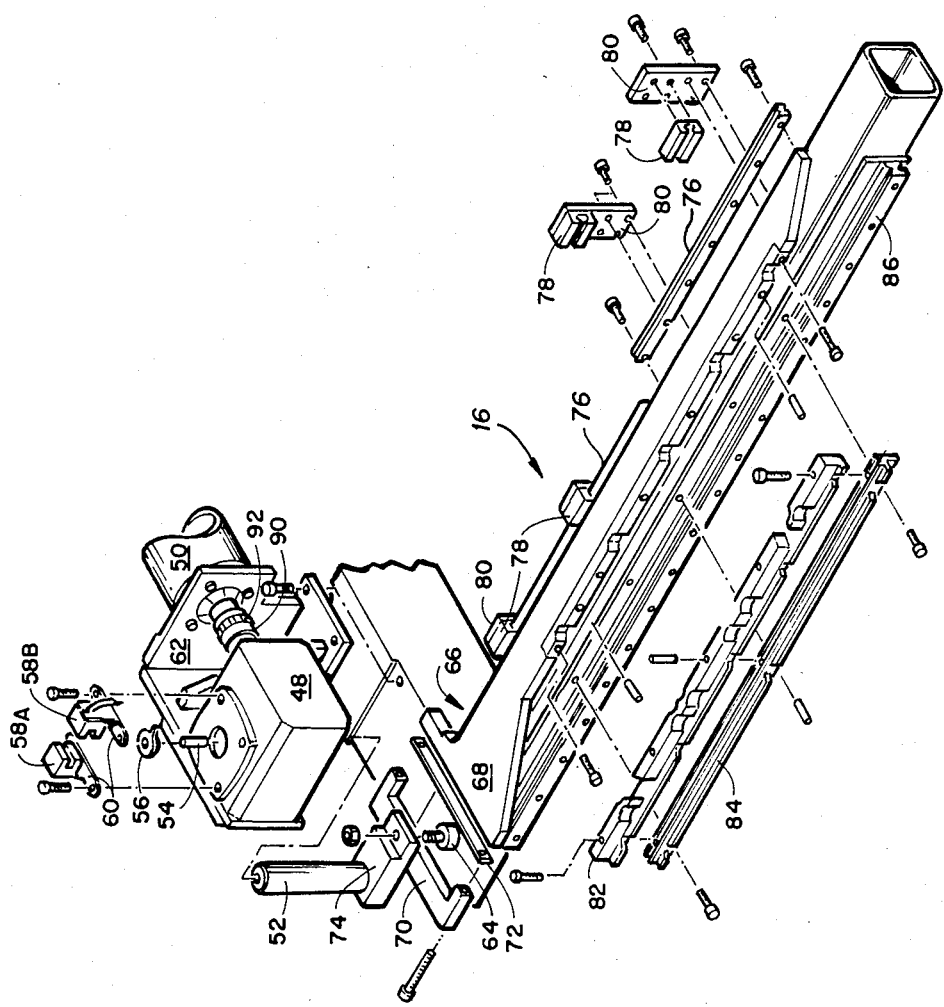

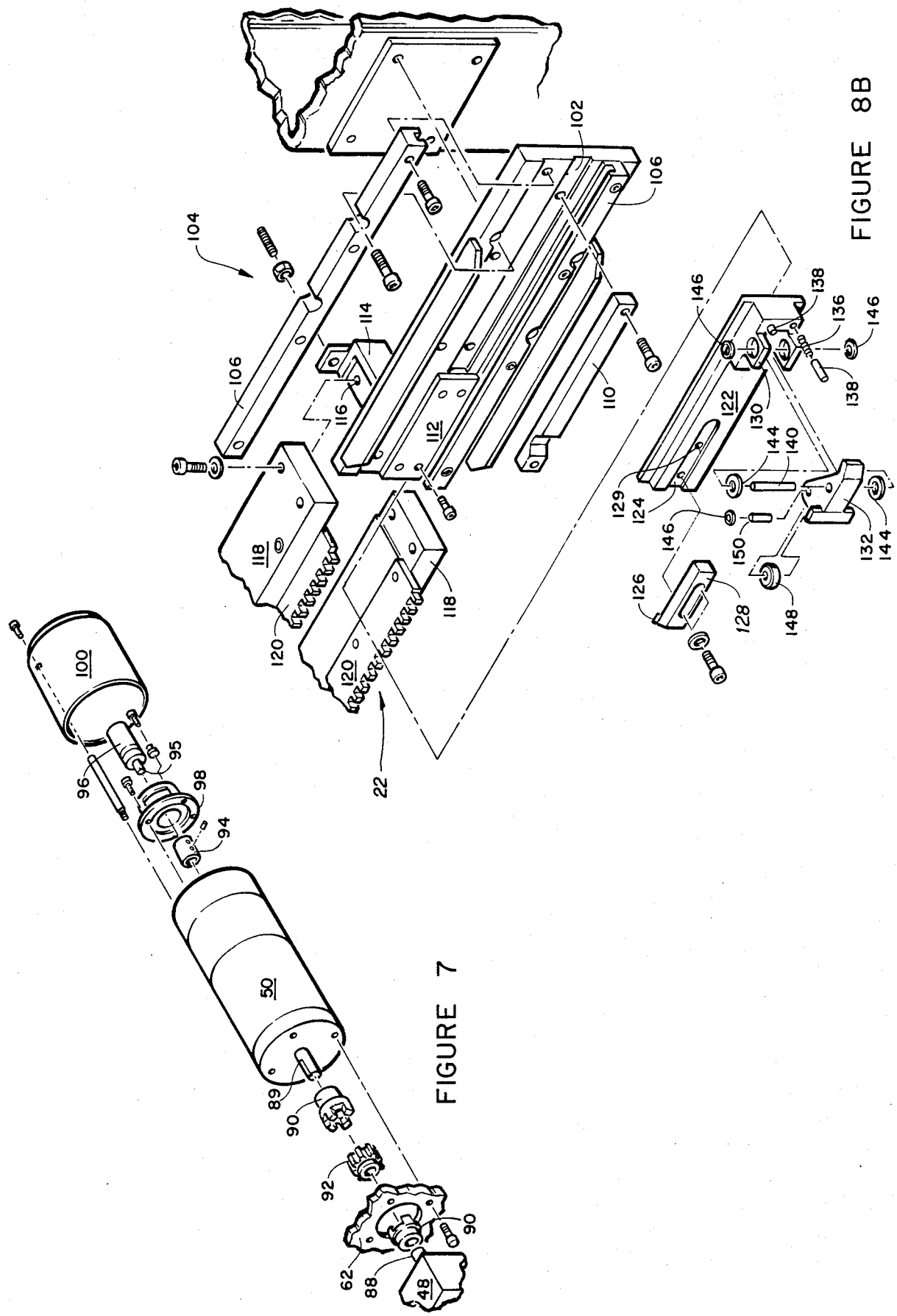

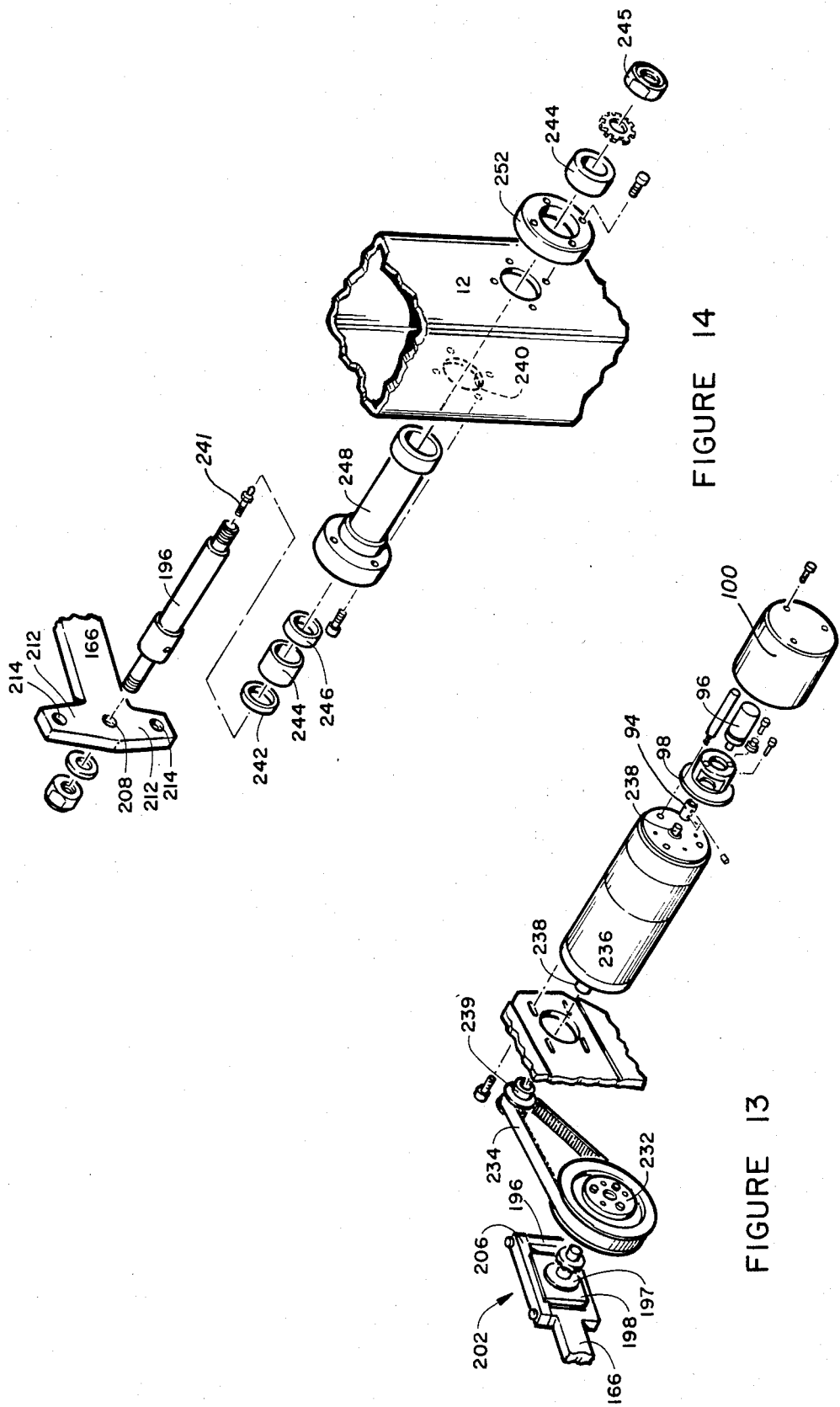

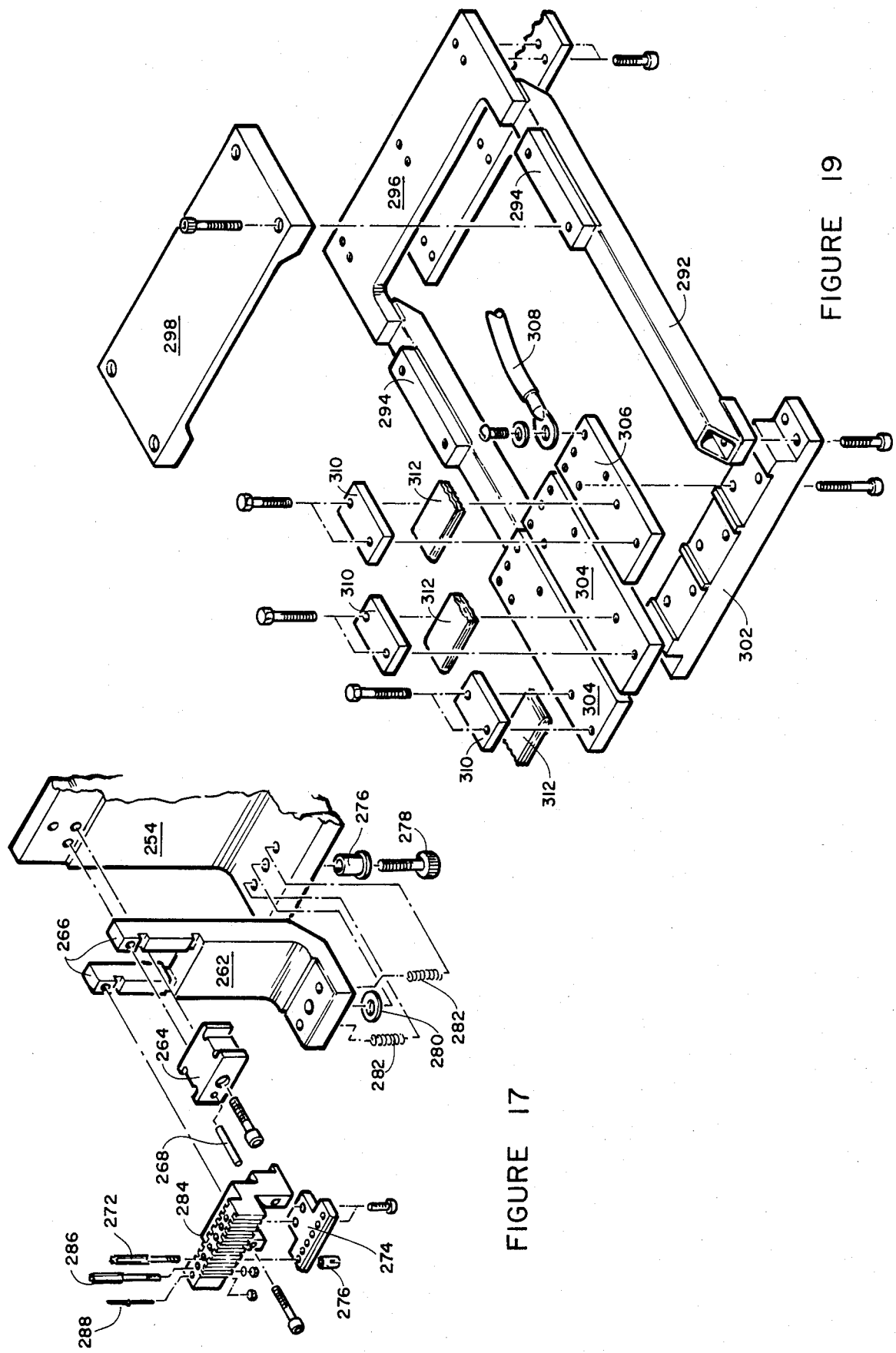

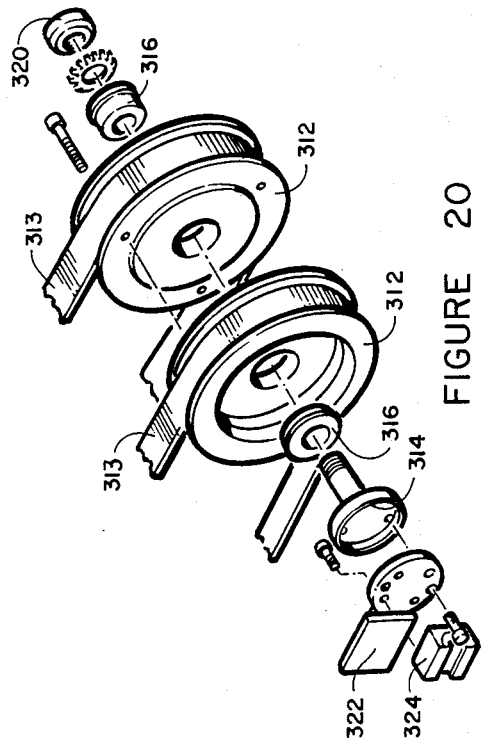
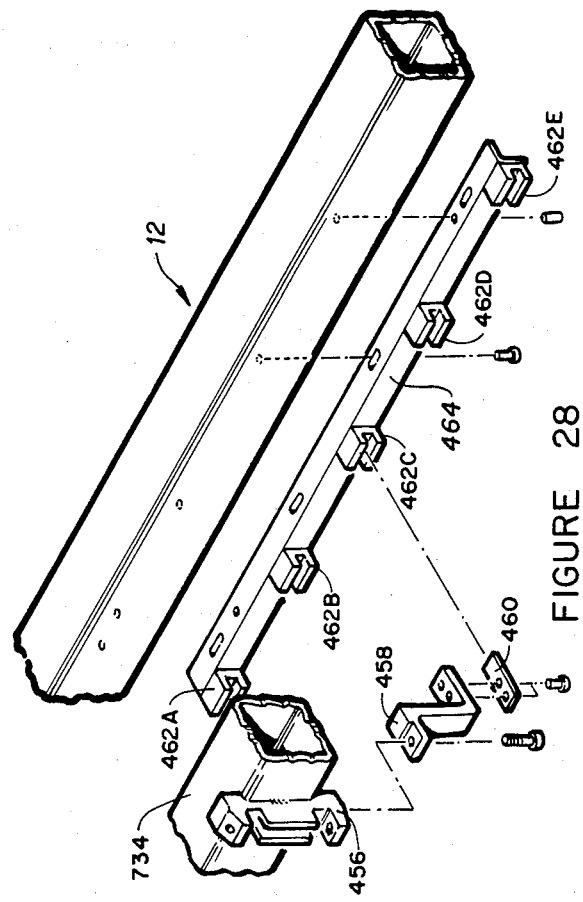
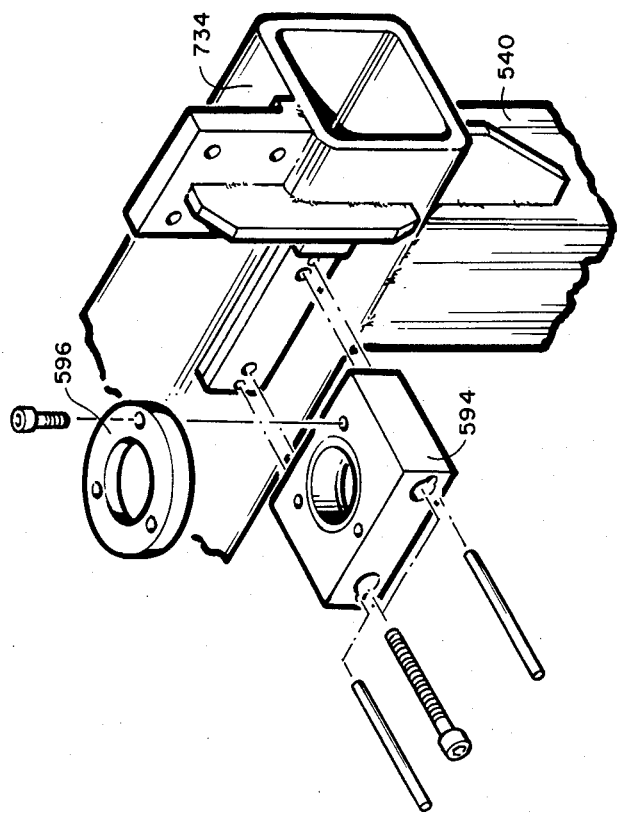
FIGURE 20
FIGURE 28
FIGURE 34

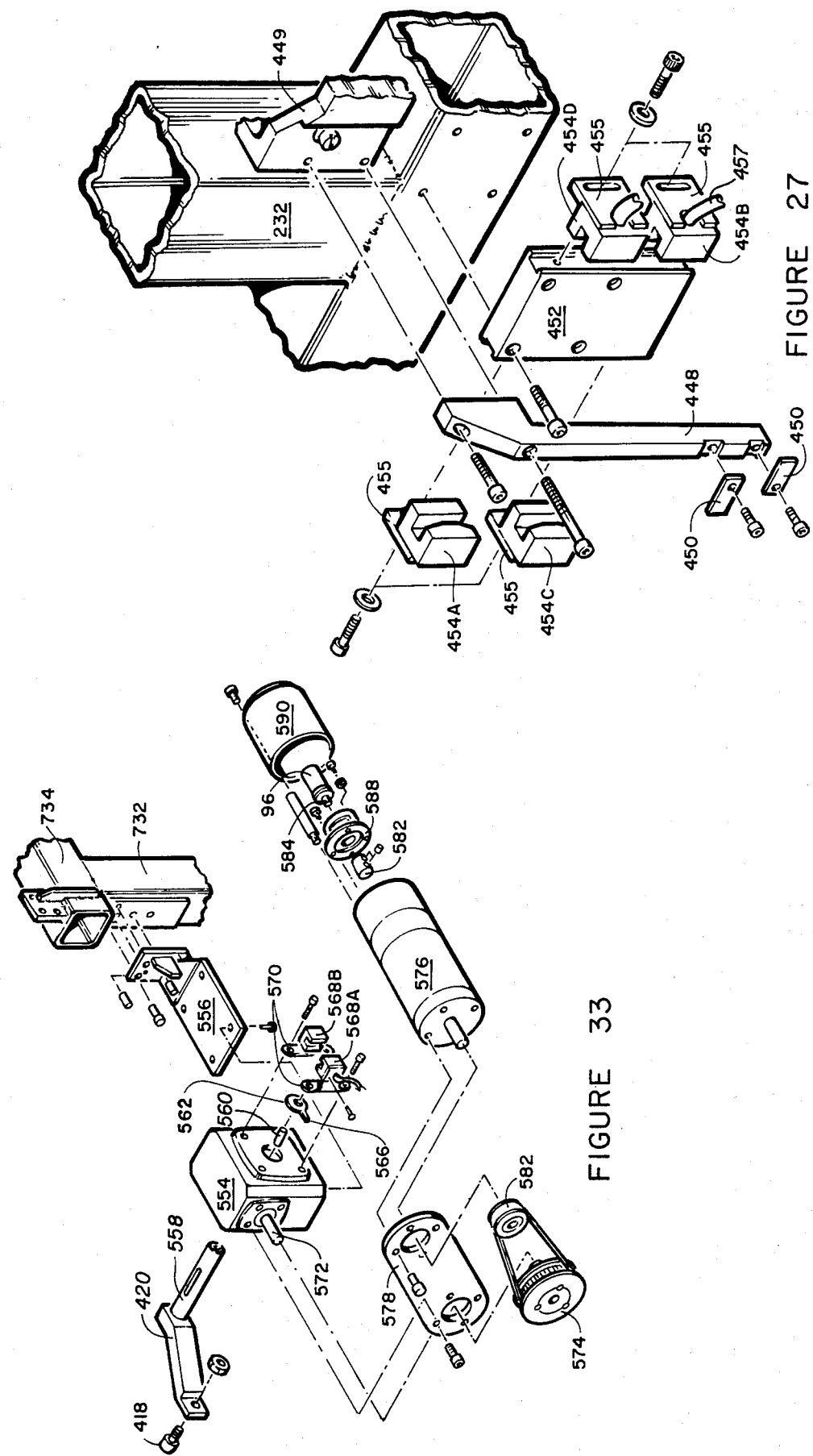

AUTOMATIC METALLIC HONEYCOMB CORE MANUFACTURING MACHINE

BACKGROUND OF THE INVENTION

This invention is directed to a machine for manufacturing honeycomb core material and more particularly to a machine for manufacturing honeycomb core material of finite width and height from a continuous corrugated foil strip material.

Many manufacturing processes, such as welding, require that several parts be brought together and assembled precisely at a work station, held thereat in such assembled relation for the duration of the welding period and then moved from the work area to make way for successive parts to be introduced, assembled, and acted upon therein. A situation of this type arises in the manufacture of honeycomb core material. In forming this honeycomb core material, strip feed and positioning means comprising inter-nesting electrode and indexing pins juxtaposed sections of corrugated metal ribbon or strips so that troughs of one strip rest on the crests of an adjacent strip. The strips are then held in this position while contacting electrode pins on the upper and lower welding assemblies and welding wheels on the weld wheel assemblies pass welding current through the abutting nodes of the adjacent crests and trough to thus weld the same together and form adjacent cells of the honeycomb core. When selected crests and troughs have been welded together, the electrode pins and welding members are withdrawn from the thusly formed cell and, following the shuttling of the core by the indexing pins, the indexing pins are re-inserted and re-applied as the process is repeated, as necessary, to complete the desired core.

For a completely satisfactory result, providing high quality honeycomb core, the juxtapositioning of the strip sections must be very precise; the pressure, movement and electrical contacting of the welding members must be critically controlled and precision positioning, alignment, and movement of the parts must persist repetitively in the cell-to-cell formation throughout the length and width of the core.

Various honeycomb core machines have heretofore been devices and used with varying degrees of success.

Examples of prior art machines for producing honeycomb core are found in U.S. Pat. Nos. 2,927,991 by W. A. Schoelz; 3,070,686 by P. Vinson et al.; 3,077,533 by F. H. Rohr et al.; 3,092,711 by H. B. Bennett et al. and 3,108,368 by C. W. Christinan.

In general, these prior art machines require that the maximum width of the honeycomb core panels is either dictated by the number of weld electrode positions or that the honeycomb core, or such portion produced of it, be shuttled back and forth by the operator or other means so that a width greater than the number of weld electrode positions can be accomplished. The prior art machines produced wavey or uneven surface core which had to be later trued due to the use of a single set of wheel weld electrodes. Also, in order to get a precise dimensional honeycomb core material, a thick blanket was produced initially, then this blanket was sliced or machined to get the desired width, length and thickness. This operation is very labor intensive and produces a considerable amount of waste.

SUMMARY OF THE INVENTION

The invention is directed to an automatic machine for producing a continuous length of honeycomb core material of finite width and height from a continuous strip of corrugated ribbon material. The honeycomb core produced is substantially ready for its ultimate use as it exits the machine.

The machine includes a mainframe and transport assemblies.

A plurality of upper and lower weld electrode assemblies are positioned horizontally along the width of the mainframe. The combined upper and the combined lower weld electrode assemblies are translatable vertically away from and toward each other and horizontally one in front of the other. The mechanism for translating and indexing the transport assembly is also located on the mainframe assembly.

The transport assembly which is translatable along the mainframe assembly to-and-fro carries upper and lower weld wheel assemblies which comprise a plurality of side-by-side spaced apart rotatable weld wheels. The upper and lower weld wheel assemblies are rotatable between their weld positions and their transport assembly translate non-weld positions. The transport assembly also carries a corrugated ribbon strip laying means which positions a layer of corrugated ribbon strip between horizontally displaced upper and lower weld electrode assemblies as the transport assemblies shuttles to and fro across the mainframe assembly. A spreader carried by the transport assembly spreads the weld electrode fingers of the adjacent upper and lower weld electrode assemblies vertically ahead of the ribbon laying operation to allow the ribbon to be placed on its edge horizontally between the upper and lower weld electrodes. The vertically spread apart upper and lower weld electrode assemblies are spring loaded to return to their original vertical adjacent positions as the transport assembly moves the spreader assembly along as the ribbon is positioned between the spread electrodes.

The machine operation is as follows. Firstly, a layer of corrugated ribbon strip must be positioned between the upper and lower weld electrode assemblies, this is accomplished by manually positioning the end or start of a continous source of the ribbon against one extreme end of the travel of the transport assembly between spaced apart upper and lower weld electrode assemblies. To accomplish this, the transport assembly is positioned at an extreme end of one direction of travel. The end most portion of the upper and lower negative electrodes of the upper and lower electrode assemblies are spread vertically by the spreader. Either the upper or lower negative weld electrode assemblies may be placed in the foremost horizontal position. The end of the corrugated ribbon strip is fed into the receiving mechanism of the transport assembly and inserted between the upper and lower weld electrodes at the extreme end thereof. The transport assembly is then moved along the mainframe assembly (generally manually or by selective motor activation) with the weld wheel assemblies in their non weld position. The transport assembly is then translated to the extreme opposite side of the mainframe assembly. A row of ribbon is now positioned between all of the electrodes of the upper and lower weld electrode assemblies. The upper and lower weld electrode assemblies are then separated vertically. While separated vertically, the rear most upper or lower weld electrode assembly is now moved forward horizontally and the front most upper or lower weld electrode assembly is moved horizontally rearward. The upper and lower weld electrode assemblies have now traded positions horizontally. The one of the upper and lower weld electrode assemblies which is elevated is now moved vertically toward the other to position the upper and lower weld electrode assemblies one behind the other.

The transport assembly translating and indexing mechanism now indexes the transport assembly in the last mentioned direction of travel a distance equal to one half the honeycomb core cell width so that the crest and trough of the adjacent strips of ribbon foil will register. The transport assembly is then translated along the mainframe assembly in a reverse direction toward the opposite end of the machine. The translation of the transport assembly spreads the weld electrodes of the upper and lower weld electrode assemblies ahead of the ribbon laying mechanisms and positions the next layer of corrugated ribbon with crest and trough registration as it translates. When the transport assembly reaches a predetermined distance of travel, the translation thereof ceases and the positive weld wheel electrode assemblies are translated from a rest position (away from each other) toward each other and toward the weld finger electrodes. When their maximum travel in these directions are reached, the weld wheel electrodes rotate inward toward and into rolling contact with the outside surface of the crest and trough registration of the ribbon last positioned where a simultaneous weld is performed at each crest and trough registration. The wheel electrodes then reverse their direction of rotation and travel returning to the original rest position. The transport assembly is again translated along the mainframe assembly and stopped at selected locations where similar weld operations are performed until the end of that direction of travel is reached. Prior to the end of travel the transport assembly the spreader assembly is translated there along to provide a turn around position of the corrugated ribbon strip. The opposite one of the weld electrode assemblies then translates vertically away from the other weld electrode assembly and the present foremost weld electrode assembly translates to the rear and the rear most translate to the front. This shuttles the last welded portion of the core toward the rear of the machine. The shuttling back and forth of the transport assembly and the operation of the weld wheel electrodes in this manner forms continuous honeycomb core.

The finished honeycomb core exits the rear of the mainframe assembly along a table by the combination of the re-positioning of the weld electrode assemblies alternately one behind the other and the force of gravity acting thereon.

An object of this invention is to produce a continuous length of honeycomb core of finite height and width suitable for ultimate use as it exits the machine.

Another object of the invention is to translate the welding mechanism during honeycomb core manufacture rather then shuttling the formed core.

Another object of this invention is to address a different portion of the wheels of the wheel electrodes on successive weld operations to extend the life of the weld wheels.

Still another object of this invention is to provide an apparatus for making honeycomb core of great uniformity and high quality.

Still another object of this invention is to provide an apparatus wherein the honeycomb core produced therefrom can be made at relatively high production rates.

It is a still further object of this invention to provide an apparatus for making a honeycomb core which has a uniform high quality weld at abutting crests and troughs of the corrugated strips comprising the core.

It is a further object of this invention to provide a novel apparatus for feeding corrugated ribbon successively through the sequential weld stations along the mainframe.

It is a further object to utilize two sets of opposing weld wheel assemblies to produce a horizontally flat honeycomb core.

Still other objects, features and advantages of the present invention are those inherent in or to be implied from the following detailed description of the preferred embodiment of the invention, reference being had to the accompanying drawings wherein:

BRIEF DESCRIPTION OF THE DRAWINGS

FIG. 3 is a perspective view of the mainframe assembly of the invention;

FIG. 6 is an exploded showing taken in the area indicated by the arrow 6—6 of FIG. 3;

FIG. 7 is an exploded showing taken in the area indicated by the arrow 7—7 of FIG. 3;

FIG. 8B is an exploded showing taken in the area indicated by the arrow 8B—8B of FIG. 3;

FIG. 13 is an exploded showing taken in the area indicated by the arrow 13—13 of FIG. 3;

FIG. 14 is an exploded showing taken in the area indicated by the arrow 14—14 of FIG. 3;

FIG. 17 is an exploded showing taken in the area indicated by the arrow 17—17 of FIG. 15;

FIG. 19 is an exploded showing taken in the area indicated by the arrow 19—19 of FIG. 18;

FIG. 20 is an exploded showing taken in the area indicated by the arrow 20—20 of FIG. 18;

FIG. 27 is an exploded showing taken in the area indicated by the arrow 27—27 of FIG. 5;

FIG. 28 is an exploded showing taken in the area indicated by the arrow 28—28 of FIG. 5;

FIG. 33 is an exploded showing taken in the area indicated by the arrow 33—33 of FIG. 5;

FIG. 34 is an exploded showing taken in the area indicated by the arrow 34—34 of FIG. 5;

DETAILED DESCRIPTION

Figure 1:
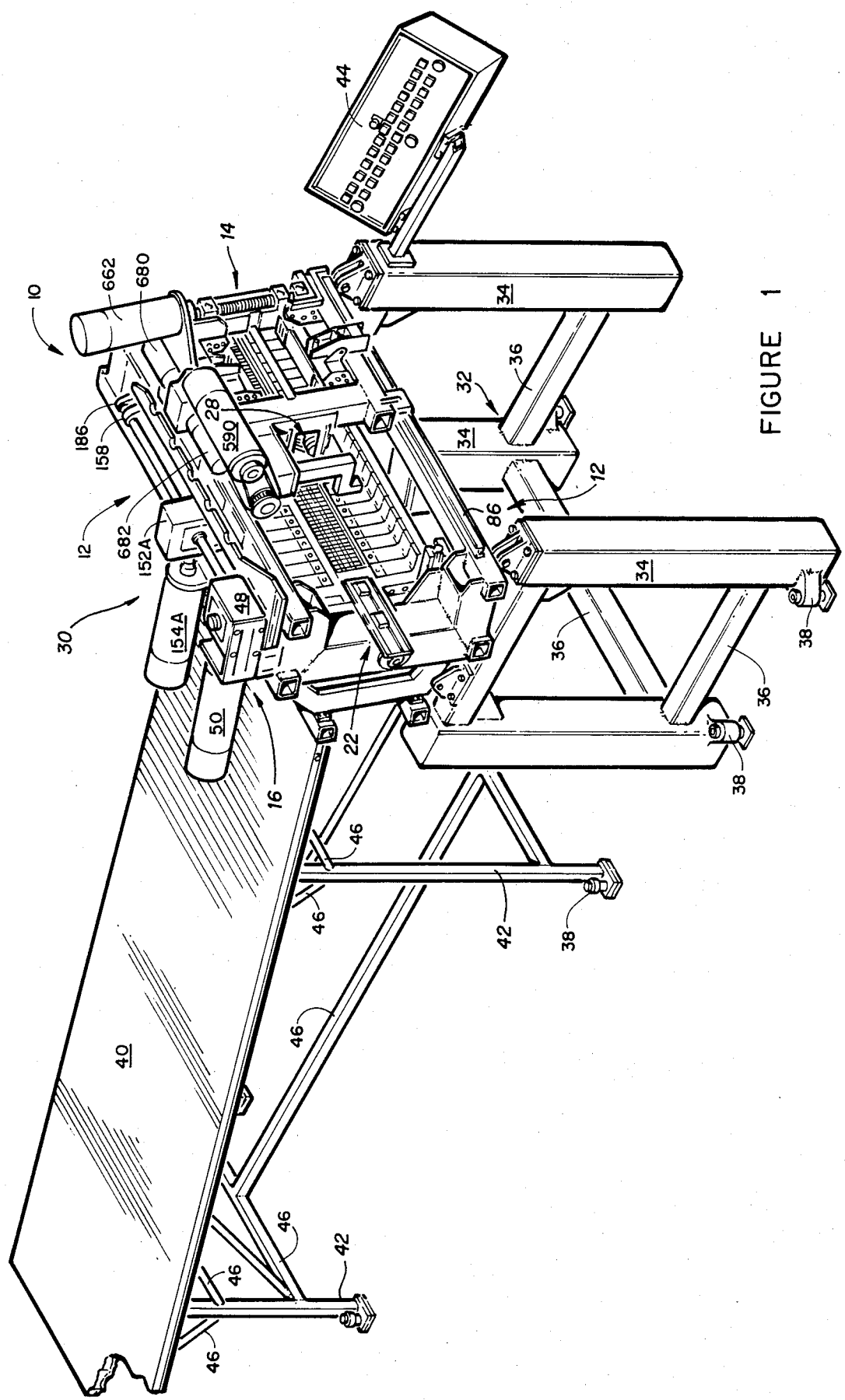
FIG. 1 is a perspective showing of the invention including a table for receiving the finished honeycomb core as it leaves the machine.

The honeycomb core manufacturing machine 10 of the invention is an electrically operated, pneumatically actuated welding machine that produces a continous length of honeycomb core of a specific thickness and width.

The elements of the machine 10 consist of a mainframe 12 and a transport assembly 14 translatably mounted thereon by.

The machine 10 automatically produces a continuous length of honeycomb core from a preshaped foil ribbon 11 which is fed into the machine and automatically welded simultaneously at each of ten weld stations, five in each direction of transport assembly travel. It should be understood that more or less than ten predetermined weld stations may be selected without changing the intent of the invention. The foil ribbon is shuttled through the machine 10 through a successive series of weld cycles to form a honeycomb core panel. The honeycomb core is typically produced by the machine 10 at the rate of approximately one hundred eleven inches in eight hours. Obviously the various operational speed of the machine may be altered to produce more or less honeycomb core during a given time period.

Referring now to FIGS. 1-5, the mainframe 12 comprises a transport translating assembly 16, a weld finger assembly 18, a crank assembly 20, a stripper assembly 22 and a cable carrier assembly 24. The transport installation 14, translatable along upper and lower rails 86 by means of bearings 87, (see FIGS. 4 and 5) comprises a transport index assembly 26, a weld wheel assembly 28 and a spreader assembly 30.

Referring now specifically to FIG. 1 which shows a perspective view of the machine 10. The mainframe 12 is mounted on a base assembly 32. The base assembly 32 comprises rectangular steel legs 34 with cross-braces 36 therebetween. Height adjustors 38 are positioned on the bottom end of each leg 34 and have contact with the machine support surface. These height adjusters are length adjustable to provide leveling of the machine. Attached to the rear of the machine 10 is a table 40. This table is elevated slightly at the machine attached end. The surface of the table accepts the honeycomb core as it exits the machine during fabrication. The table may be coated or include a lubricious surface which allows the finished honeycomb core to easily slide away from the machine. The table 40 like the machine base assembly is supported by rectangular steel legs 42 and cross-braces 46 of a somewhat smaller cross-section than those supporting the heavy machine base assembly. Levelers 38 are also employed on the table by ends for vertical positioning of the table.

Attached to the front side of the base assembly is a control box 44. The control box is interconnected to the machine through electrical wires (not shown) within mount 46.

Figure 2:
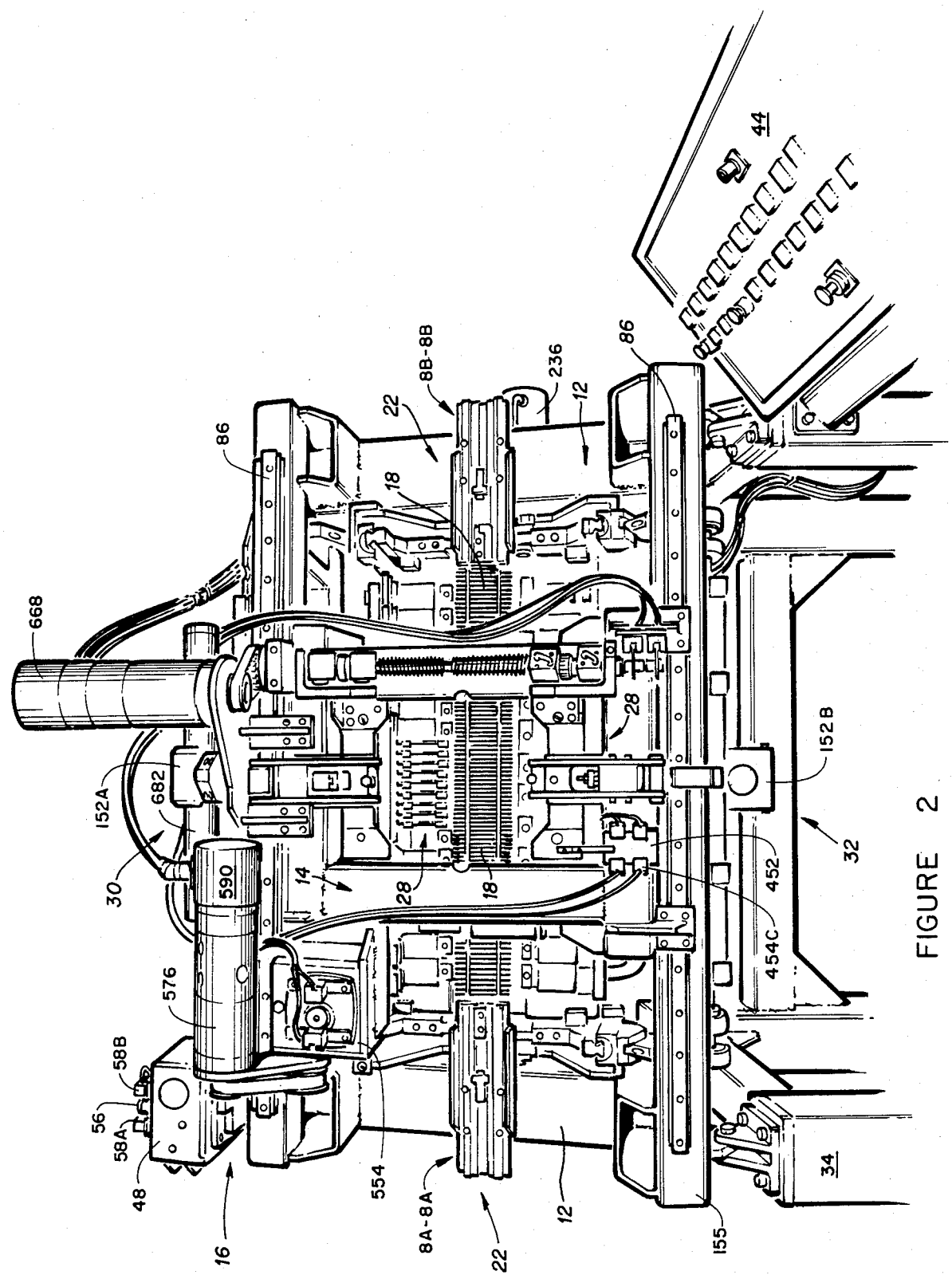
FIG. 2 is a front elevated view of the machine of FIG. 1.
Figure 2A:
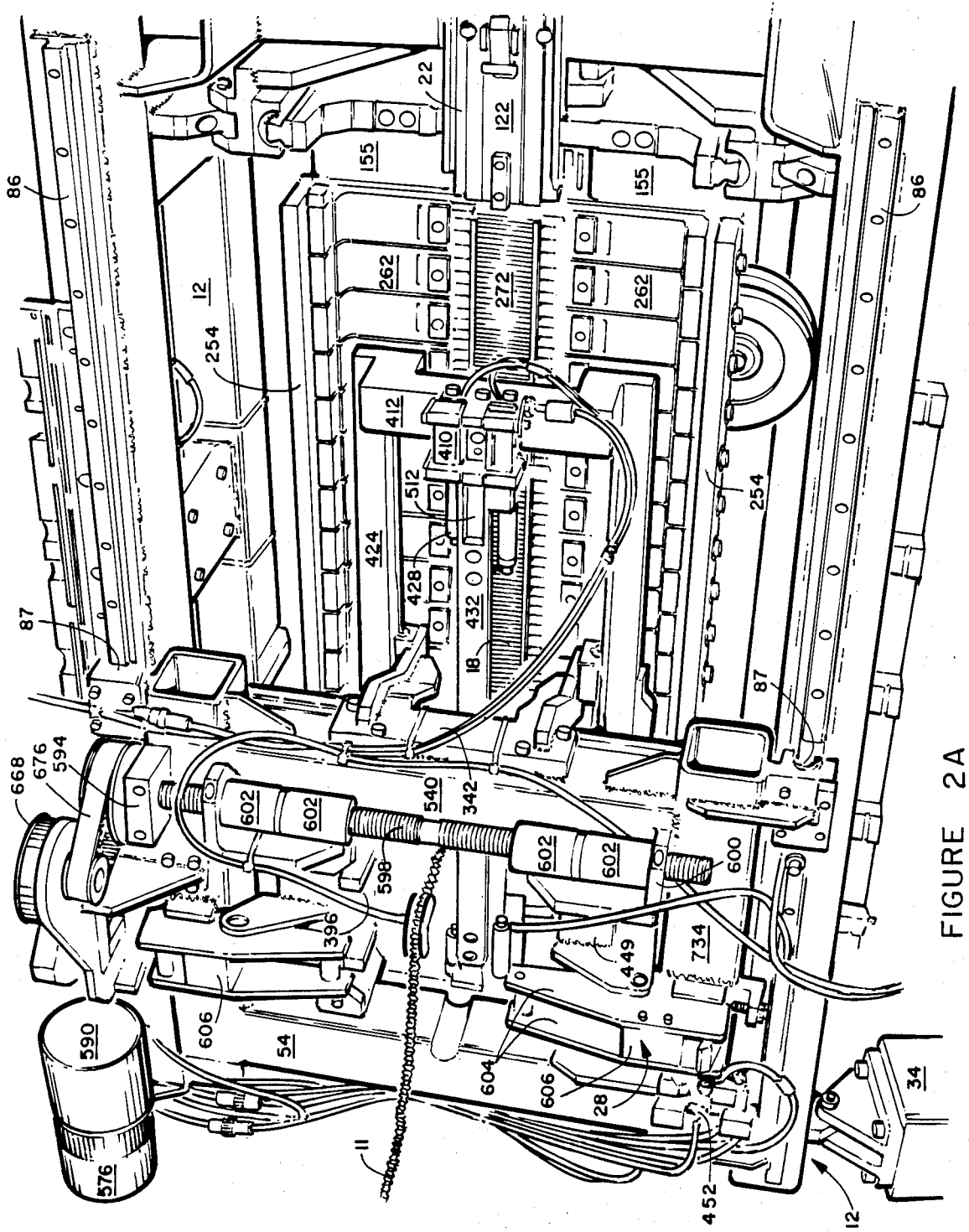
FIG. 2A is a showing of the machine similar to FIG. 2 with the addition of the transport index assembly of FIG. 26 incorporated therein.
Figure 5:
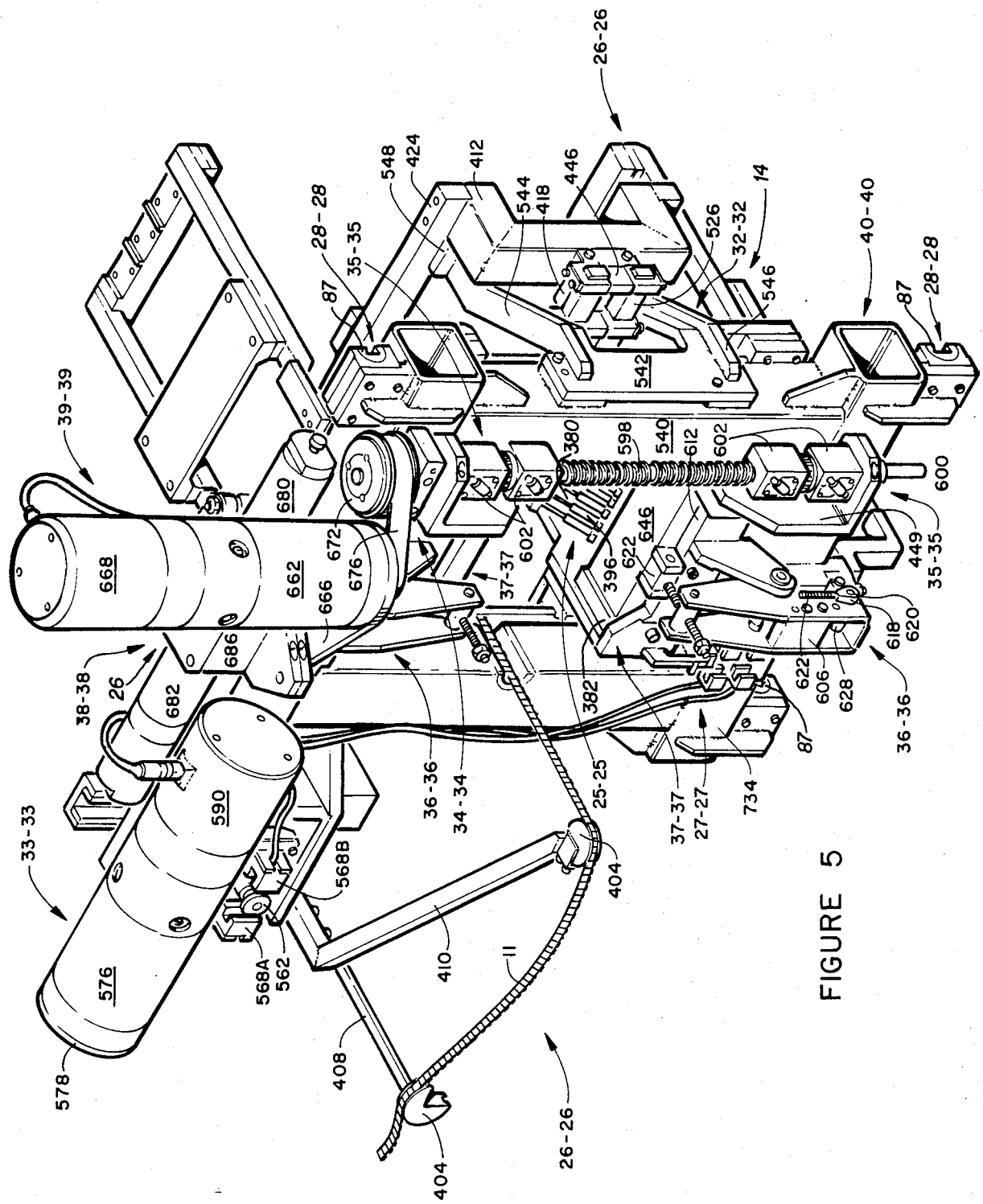
FIG. 5 is a perspective showing of the transport assembly the machine of FIG. 1.
Figure 26:
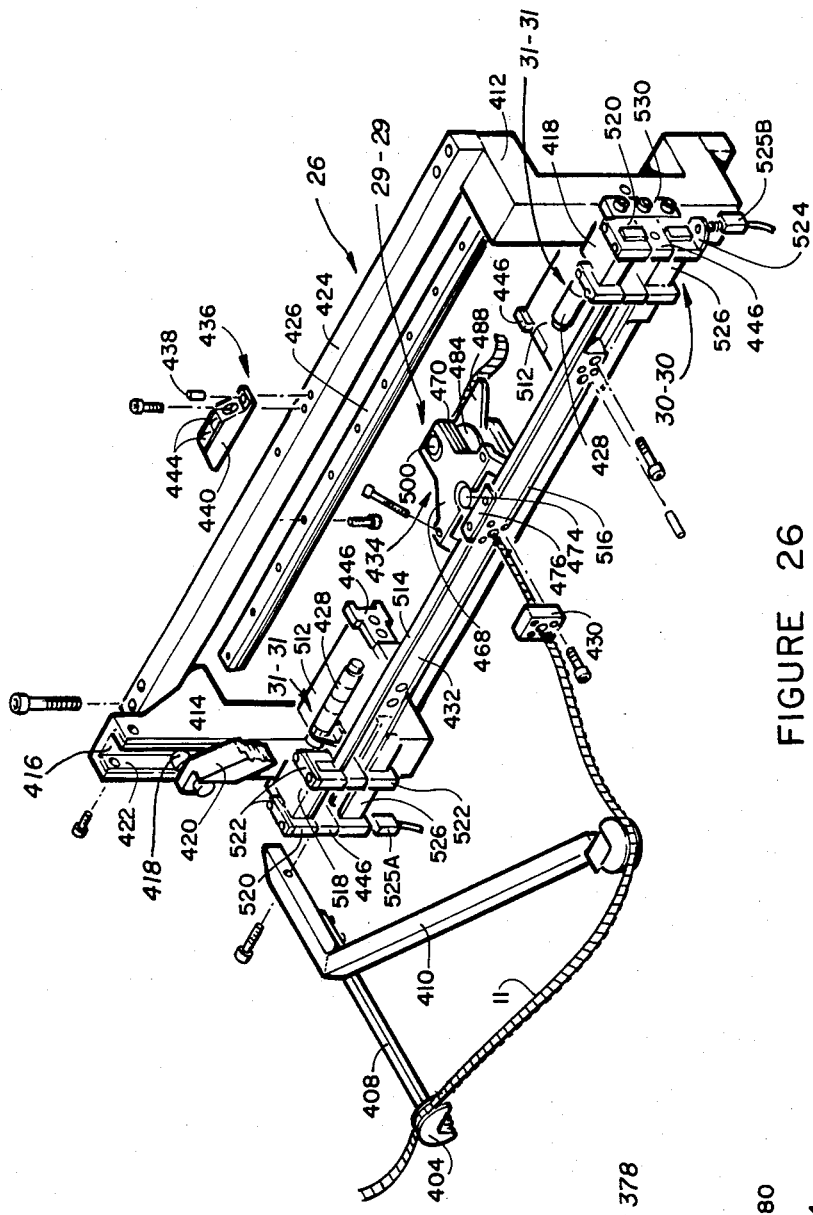
FIG. 26 is an exploded showing taken in the area indicated by the arrow 26—26 of FIG. 5.

FIG. 2A shows a similar showing of the machine of FIG. 2 with the transport index assembly of FIG. 26 incorporated therein, as in FIG. 5. The transport assembly is shown translated to the left of the Figure.

Figure 2B:
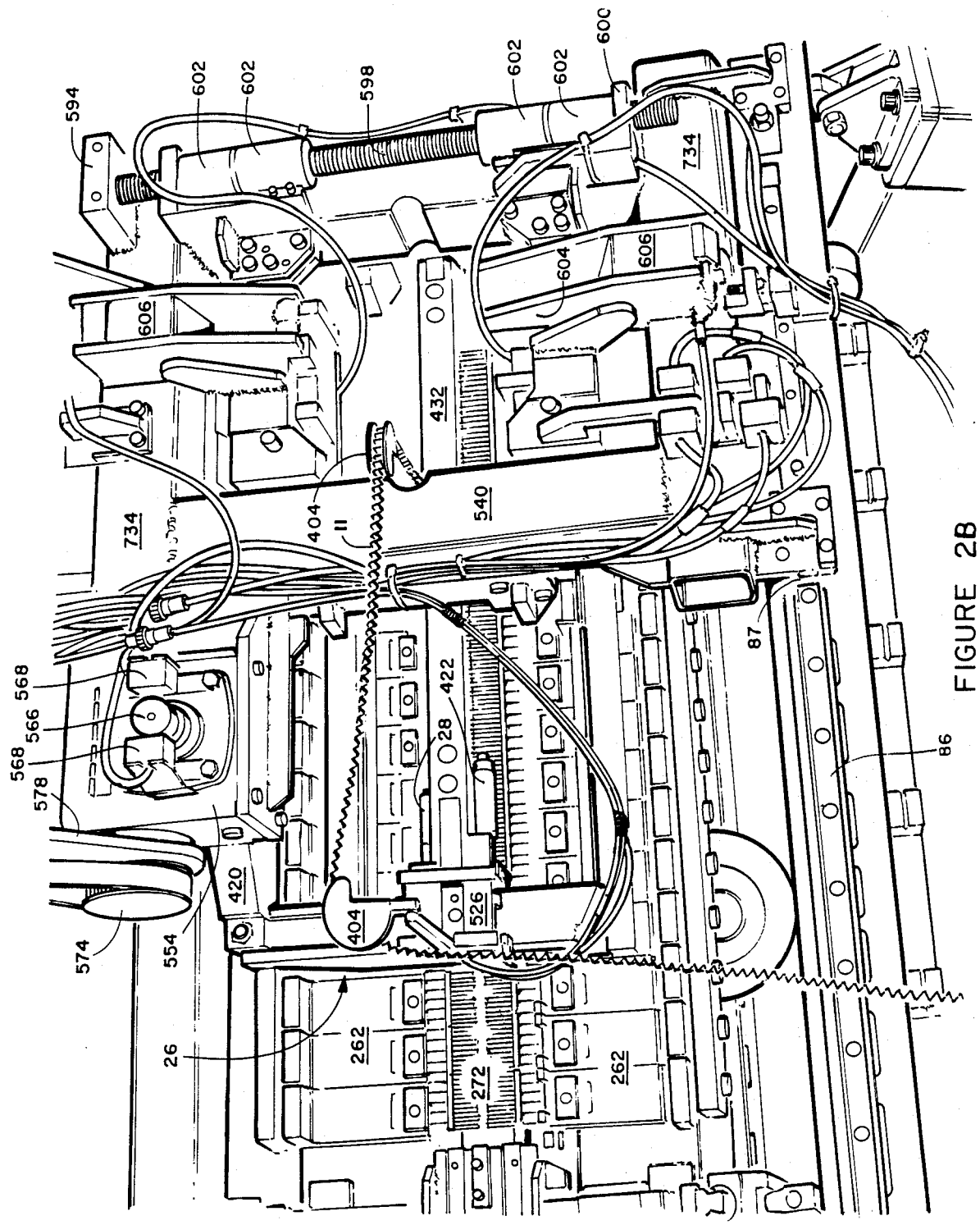
FIG. 2B is a showing similar to FIG. 2A with the transport installation translated to a different location.
Figure 4:
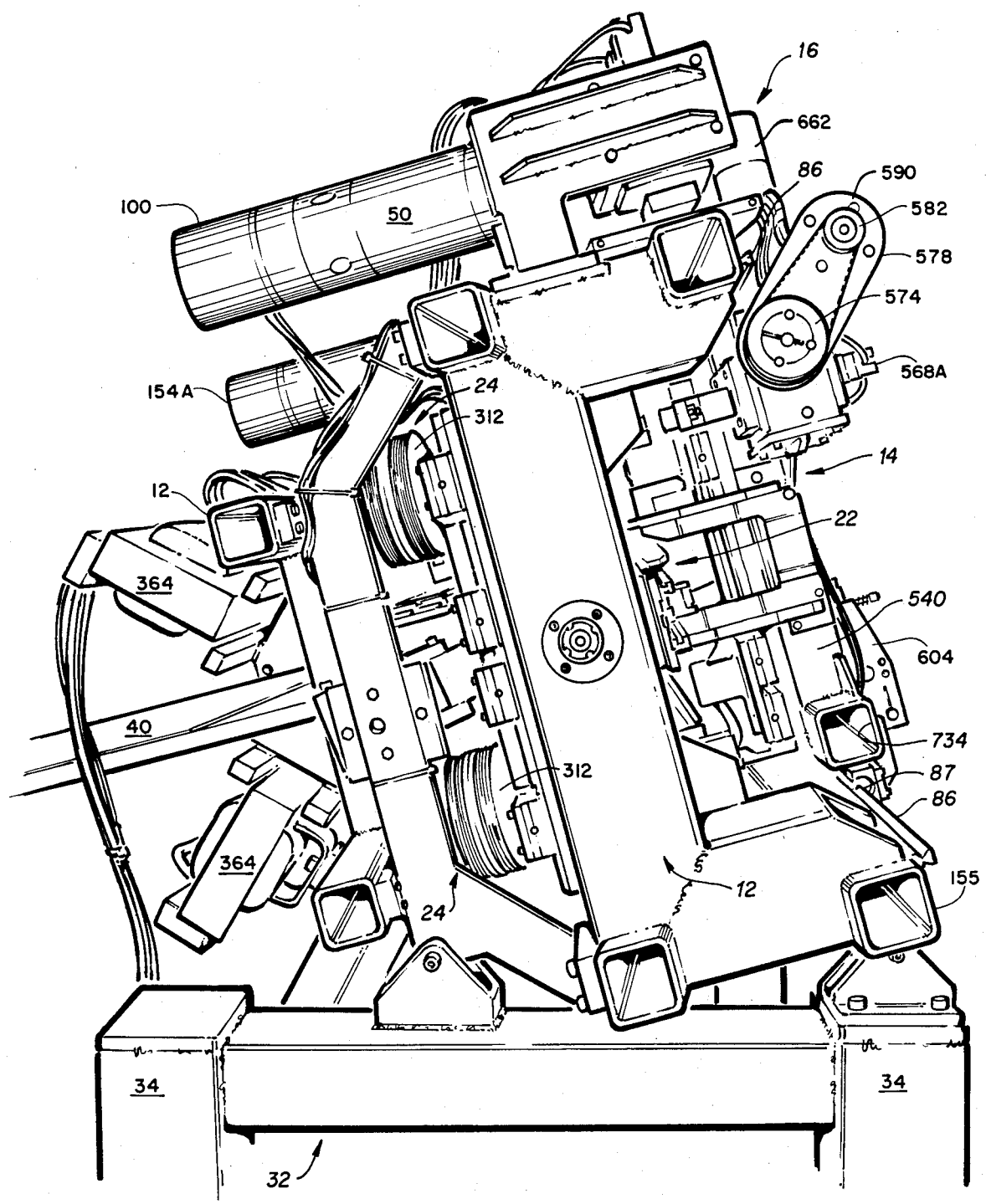
FIG. 4 is an end view of the machine of FIG. 1.

FIG. 2B is similar to 2A except the transport assembly is shown translated to the right of the Figure.

Referring now to FIG. 6, this Figure is an exploded showing taken in the area indicated by the arrow 6—6 of FIG. 3. The mainframe transport assembly 16 mates with the transport index assembly 26 of the transport assembly 14. Attached to the outer upper end surface of the mainframe, as shown at the left of the drawing figure, is a gear reducer 48 which is driven by a D.C. servo motor 50. The output of the gear reducer is connected to cam arm 52 which rotates at a right angle with the motor shaft. The upper end of the crank arm 52 has a centrally positioned timing shaft 54. The distal end of the timing shaft is connected to an interrupter disk 56 which is located between two sensors 58A and 58B of the electric field type. The sensors are secured to sensor mounts 60 which in turn are attached to the upper surface of the gear reducer housing by means of screws threaded into the housing. The D.C. servo motor 50 is likewise attached to the mounting plate 62.

Attached to the lower end of the crank arm 52 is a cam follower 64. An index plate assembly 66 which includes index plate 68 is attached to the mainframe adjacent the gear reducer and D.C. motor mount. On the index plate 68 at the left of the Figure, is an end cap 70 attached by screws. A wear plate 72 is positioned between the ends of the index plate and the end cap. The cam follower 64 is positioned on an arm 74 which extends from its attachment to the crank arm 52. The cam follower 64 provides an eccentric drive from the gear reducer 48 output to the index plate 68. On the back surface of the index plate 68 a bearing way is located. The bearing way is segmented into two parts which are secured in place on the index plate by means of screws. Riding on the bearing way are bearings 78 which are secured to the mainframe allowing the index plate 68 to freely translate therealong. The bearings 78 are secured by bearing carriers 80. The bearing carriers 80 are secured to the mainframe by means of screws. Connected to the front of the index plate 68 is a detent rail 82 and an index rail 84. The detent rail is secured to the index rail by means of dowels and screws. A bearing rail 86 is likewise attached to the outer surface of this combination.

Referring now to FIG. 7. This Figure depicts an exploded showing taken in the area indicated by the arrow 7—7 of FIG. 3. The left hand side of the Figure shows a corner of the gear reducer 48 for the purpose of reference. The gear reducer input shaft 88 attaches to a coupling half 90. The D.C. servo motor 50 is mounted to a mounting plate 62 (shown in part for reference). The D.C. servo motor shaft 89 extends from the motor housing and has attached to its distal end a coupling half 90. A coupling insert 92 meshes with both coupling halves 90 thereby engaging the motor shaft 89 to the gear inducer input shaft 88. The rotation of the shaft 89 of the D.C. servo motor 50 drives the crank arm 52 actuating cam follower 64. The opposite end of the D.C. servo motor shaft (not shown) similar to the exposed end is attached to a shaft coupling 94 that is attached at its opposite end to a shaft 95 of a resolver 96. The resolver is attached to the motor housing by means of a resolver mount 98. A closure 100 attached to D.C. servo motor 50 and encloses the end of the motor and the resolver assembly. The closure 100 is attached by threaded stand-offs and screws.

Figure 8A:
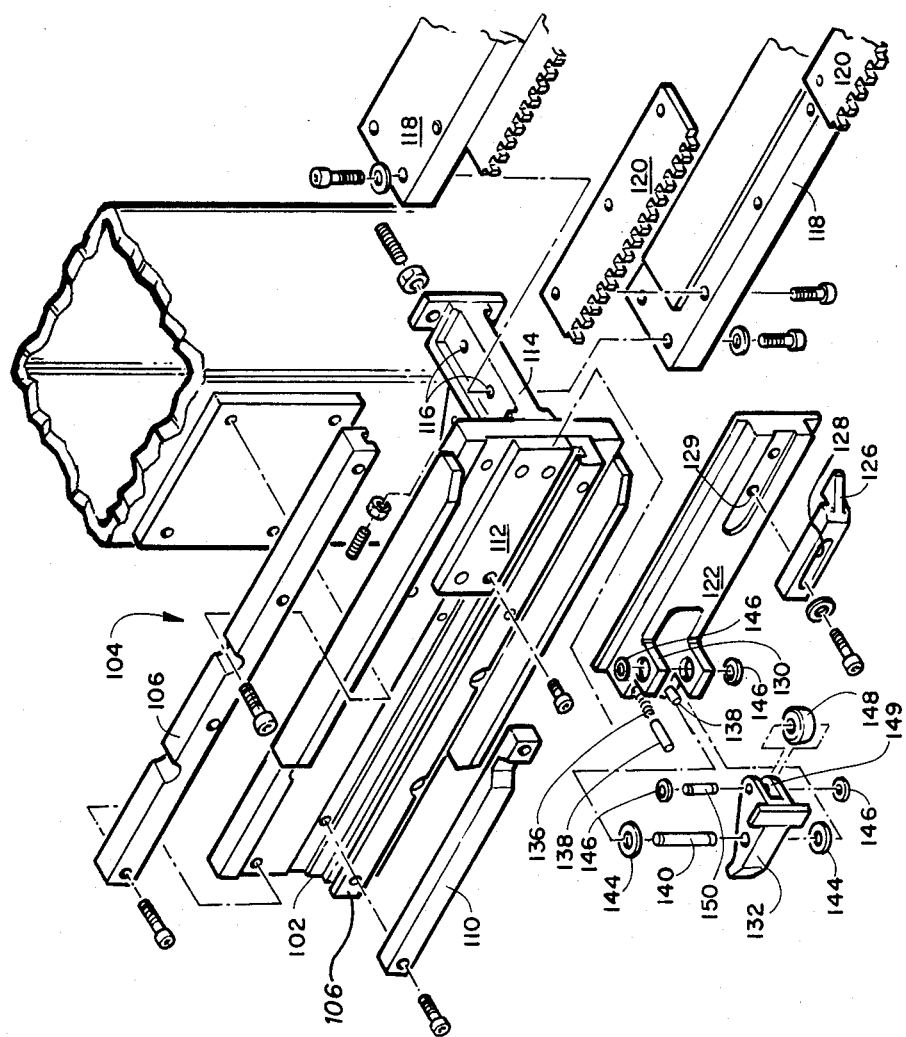
FIG. 8A is an exploded showing taken in the area indicated by the arrow 8A—8A of FIG. 3.

Referring now specifically to FIG. 8A which is an exploded showing taken in the area indicated by the arrow 8A—8A of FIG. 3. A slide mount 102 is attached to the main frame by means of slide assembly 104 which consists of upper and lower portions that are attached to the mainframe by a plurality of screws. A pair of slides 106 are shown one on the bottom surface and one on substantially the upper surface of the slide mount 102. Attached centrally to the slide mount 102 is a detent rail 110 attached by means of screws. A pad 112 is positioned adjacent the detent rail 110. The pad 112 is also attached by means of screws. A rearwardly protruding end portion 114 of slide mount 102 has apertures 116 for securing thereto a pair of comb carriers 118, one shown attached to the bottom and one to the upper surface. Combs 120 are carried by comb carrier 118. Attachment of the comb carriers to the slide mount is accomplished by screw means. Similarly attached to pad 112 is a slide rail 122. An indentation or slot 124 in the slide rail 122, shown on the right hand side of the rail, receives a foil clamp 126 which is attached by screw means. The foil clamp 126 is longitudinally adjustable along the indentation by means of the attachment screw passing through elongated slot 128 and into an aperture 129 in the indentation. On the opposite side of the slide rail 122, shown on the left hand side of the Figure, are a pair of protrusions 130 for receiving a rocker assembly 132. On the outside surface of the slide rail 122 adjacent the protrusions 130 are a pair of apertures for receiving springs 136 (one shown) and associated plungers 138. The rocker assembly 132 is held within the protrusions 130 by means of rocker shaft 140 passing through apertures in the protrusions. Headliner bushings 144 are positioned on each end of the rocker shaft 140 on the inner surface of the protrusions. The rocker shaft is loced in place by means of retainer rings 146 on each end thereof. On the back of the rocker assembly 132, shown on the right hand side of the Figure, is a roller follower 148 positioned within the sides of a horizontal cutout 149 in the rocker assembly. A rocker shaft 150 passes through a central opening in the roller follower and apertures through the outer surfaces of the cutout and is retained in position by means of retainer rings 146.

Referring now to FIG. 8B which is a showing of FIG. 3 taken in the area indicated by the arrow 8B—8B. This Figure shows the opposite side of the mainframe and is substantially the same showing as that of FIG. 8A and therefore will not be described in detail.

Figure 9:
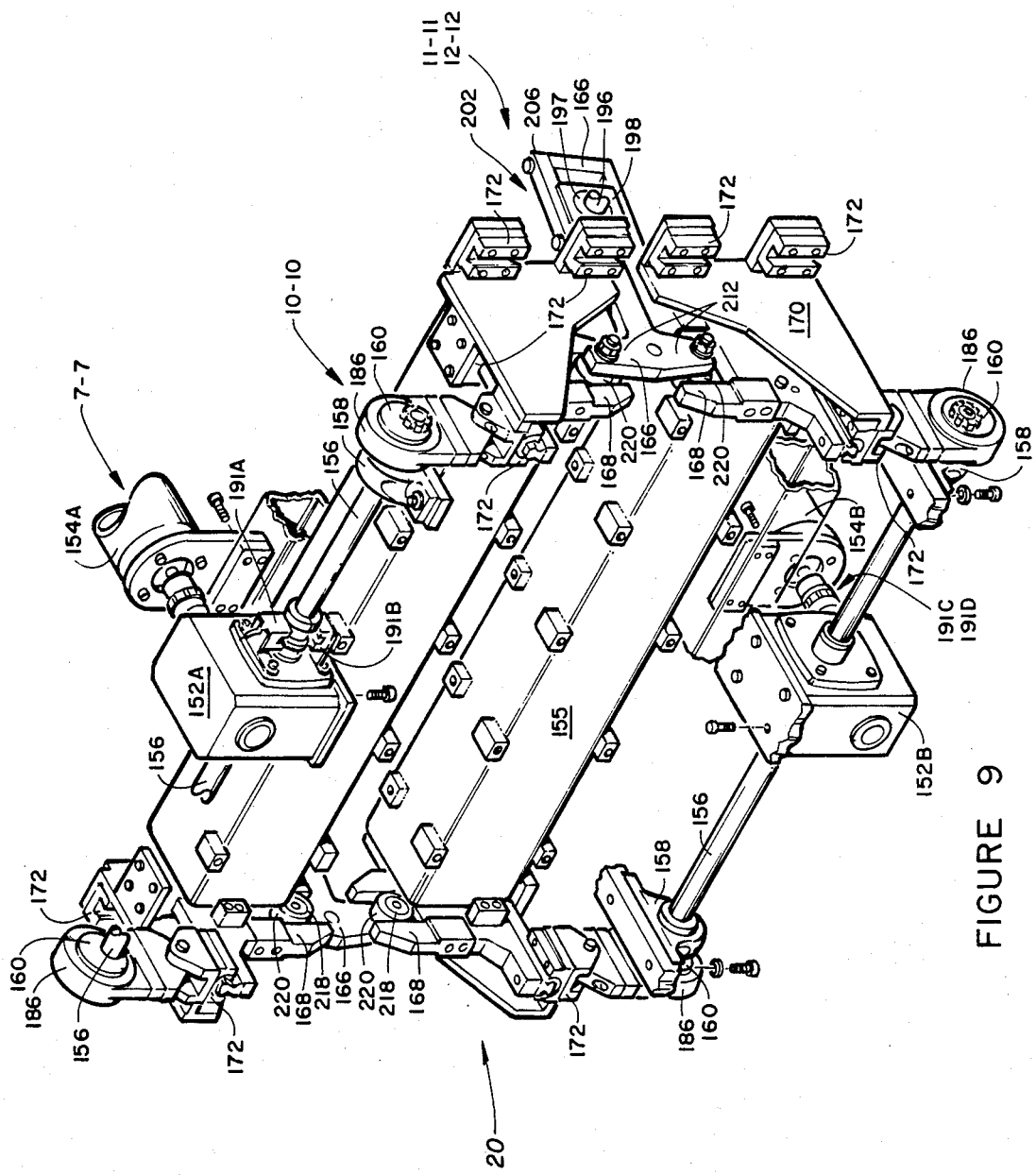
FIG. 9 is an exploded showing taken in the area indicated by the arrow 9—9 of FIG. 3.

Referring now to FIG. 9. FIG. 9 is an exploded showing taken in the area indicated by the arrow 9—9 of FIG. 3. Gear reducers, 152A and 152B respectively, are shown in the upper and lower central portions of the Figure. Associated therewith for operation thereof are two D.C. servo motors, 154A and 154B. These motors 154A and 154B are attached to mainframe beam structure 155. Each gear reducer has a drive shaft 156 extending in each direction therefrom. The drive shafts are supported on their outer ends by bearings 158 and drive eccentric bearings 160 at each end thereof. More specific details of this Figure will be hereinafter discussed.

Figure 10:
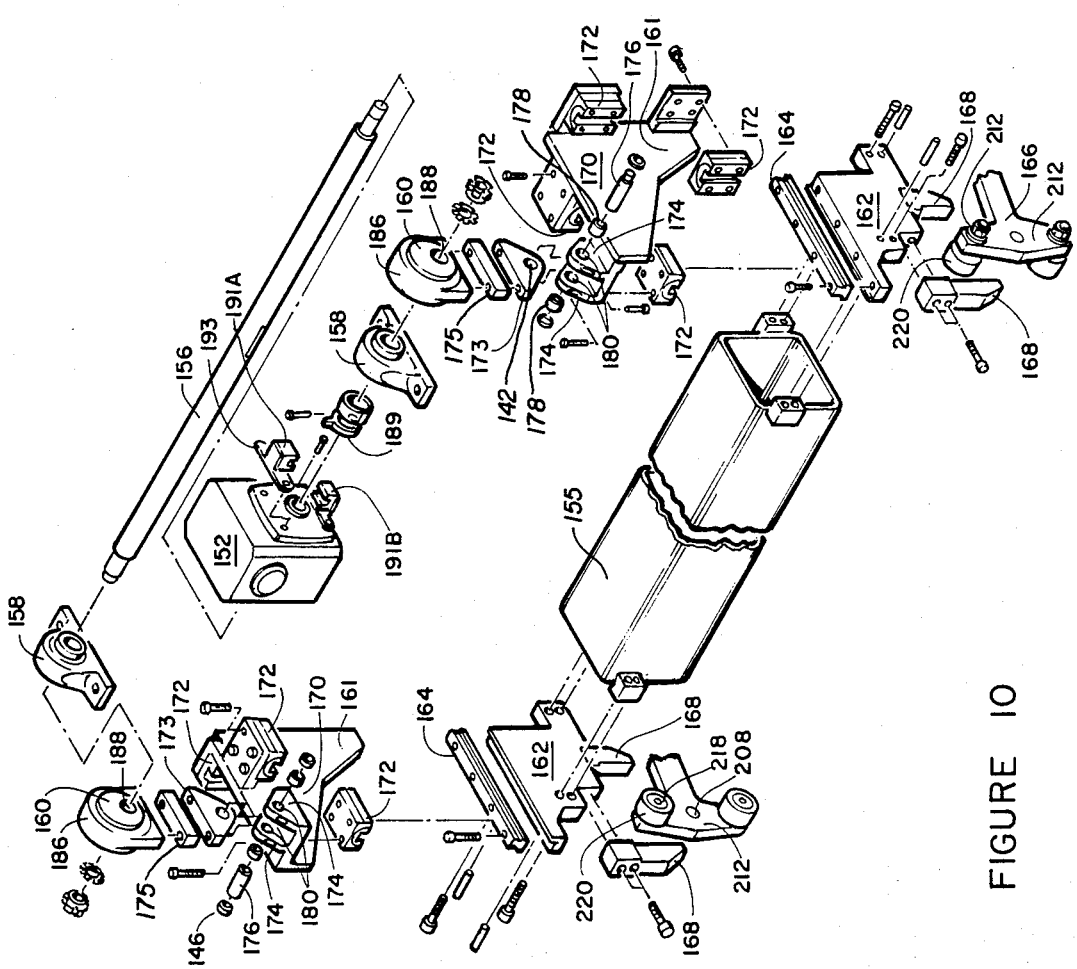
FIG. 10 is an exploded showing taken in the area indicated by the arrow 10—10 of FIG. 3.

Referring now to FIG. 10. FIG. 10 is an exploded view taken in the area indicated by the arrow 10—10 of FIG. 9. The mainframe beam structure 155 is shown for purposes of reference. Mounted on each end of the mainframe beam structure is a yolk 162. These yokes are attached by alignment pins and screws. On the upper surfaces of the yokes are positioned bearing ways 164 attached thereto by screw means. Rocker arms 166 are shown for reference purposes and will be more fully shown and described under the discussion of FIG. 11. On the forward most surfaces of the yokes are positioned caps 168 attached thereto by screw means. A floating bracket 170 is shown above the yokes. One of the floating brackets in right hand and the other left hand. The floating bracket 170 has attached thereto a plurality of bearings 172 which mate with bearing ways 164. On the upper inwardly extended surface of the floating brackets 170 is a yoke or protrusions 174 for receiving a cap 173. The cap 173 is held in a pivotal association with the upstanding protrusions 174 of the floating bracket 170 by means of an axle 176, a pair of bushings 178 mounted within apertures 180 through the protrusions 174 with retainer rings 146 at each outer distal end of the axle. The axle 176 also passes through an aperture in the cap 173. On the top of the cap 173 is positioned a spacer block 174 which is attached to connecting rods 186. An eccentric bearing 160 is received in each connecting rod. The drive shaft 156 which extends from gear reducer 152 extends through off set apertures 188 in the eccentric bearings 160 and are locked to the drive shaft by lock nut and washer combination. a chopper 189 and optical sensors 191A and 191B are shown in detail as well as their mounting means 193.

Figure 11:
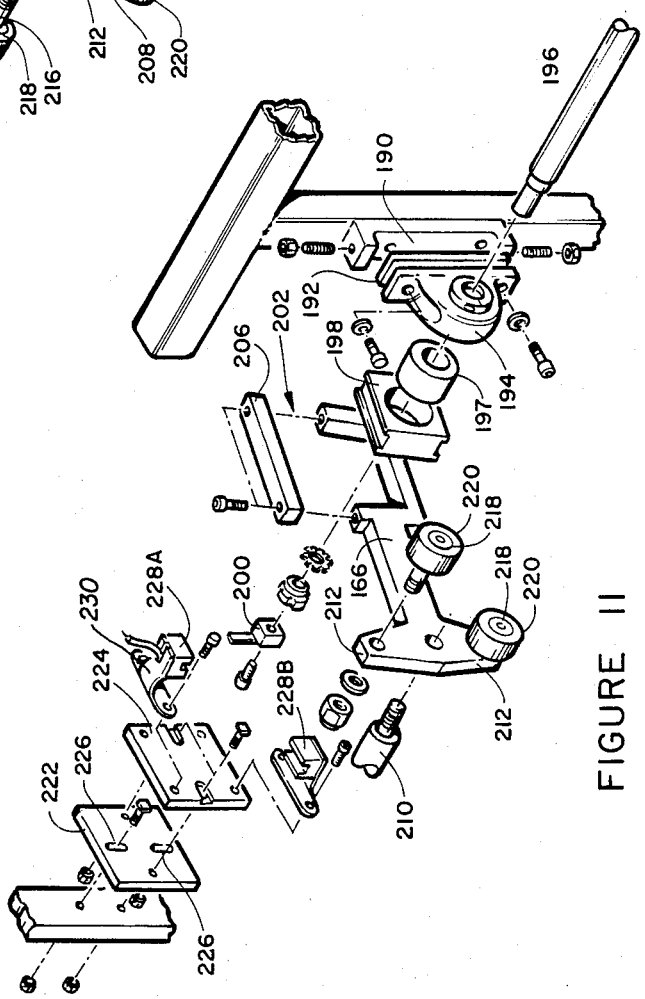
FIG. 11 is an exploded showing taken in the area indicated by the arrow 11—11 of FIG. 3.

Referring now to FIG. 11 which is an exploded showing of FIG. 9 taken in the area indicated by the arrow 11—11. Attached to the mainframe beam structure is a pillow block mount 190 for receiving a pillow block mount spacer 192 and a pillow block 194. A shaft 196 extends through the pillow block 194 and eccentric bushing 197 is positioned within bushing housing 198. The shaft 196 is held in position by means of a lock washer and nut attached to the extreme inward end of the shaft 196. On the left hand side of the Figure is a chopper 200 secured to the end of shaft 196 by means of a screw. Riding on the bearing housing 198 is a rocker arm assembly 202. The rocker arm assembly comprises the rocker arm 166 and a rocker arm cap 206. The cap 206 is held to the rocker arm 166 by means of screws. On the end of the rocker arm, at the right side of the Figure, is a central aperture 208 for receivably engaging the threaded end of a shaft 210. Positioned on each outer wing 212 of the rocker arm 166 is an aperture (one shown) for receiving bolts 216 which include an outer bearing 218 with a cam surface 220. On the left of the Figure a portion of the mainframe beam structure 12 is shown for receiving mounting plates 222 and 224. These mounting plates are held to the mainframe beam structure bracket by bolt and nut combinations. The mounting bolts are received in slots 226 and enable a vertical and horizontal translation of the plates to positioning of sensors 228A and 228B mounted thereon with respect to the chopper 200. The sensors 228A and 228B are attached to the mount plate through a bracket 230.

Figure 12:
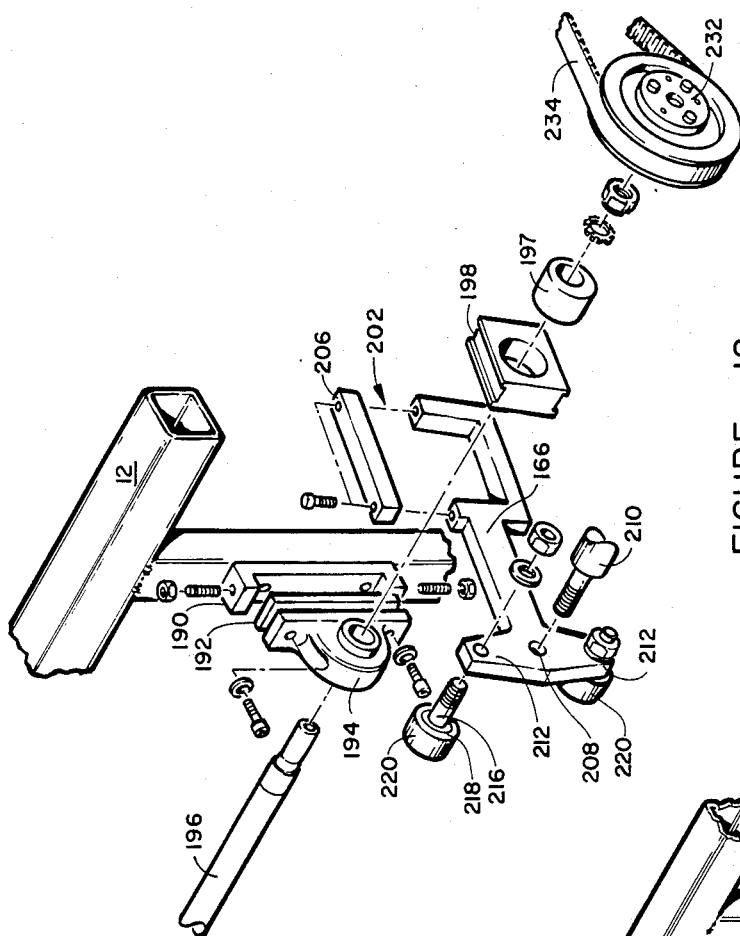
FIG. 12 is an exploded showing taken in the area indicated by the arrow 12—12 of FIG. 3.

Referring now to FIG. 12 which is an exploded view of FIG. 9 taken in the area indicated by the arrow 12—12. This showing is substantially a duplicate of the FIG. 11 showing with the showing of the opposite end of shaft 196. The opposite end of the shaft is connected to a timing pulley 232 driven by timing belt 234.

Referring specifically to FIG. 13 which is an exploded showing of FIG. 3 taken in the area indicated by the arrow 13—13. A portion of FIG. 12 is shown in the left hand side of the Figure including the rocker arm assembly 202, timing pulley 232 and timing belt 234. A D.C. servo motor 236 has a shaft 238 extending in both directions therefrom. At the left hand end of the shaft a timing pulley is affixed which engages the timing belt 234. On the other end of the motor shaft 238 is a coupler shaft 94 which is attached at its opposite end to a resolver 96. The resolver 96 is attached to the motor housing through resolver mount 98. A closure 100 attached to the motor 236 encloses the resolver assembly. The enclosure attachment as hereinbefore discussed.

FIG. 14 is an exploded showing of FIG. 3 taken in the area indicated by the arrow 14—14. One end of the shaft 196, hereinbefore depicted in FIG. 12, passes through the aperture 208 in rocker arm 166 and is held therein by means of a washer and shaft engaging nut. The opposite end of the shaft includes a hydraulic fitting 241 which provides lubrication through the interior of the shaft to the exterior bearing surfaces. Surrounding the shaft 196 is a seal 242, a needle bearing 244, a second seal 246 and a housing 248. The housing 248 passes through aperture 240 in the mainframe 12. The shaft is carried by the housing. The housing is held to the mainframe by means of screws. On the opposite side of the main frame from the rocker arm assembly is an end cap 252 secured to the mainframe in the same manner as the housing. Located within the end cap is a second needle bearing 244. The shaft is held in place by means of a lock nut 245 and washer combination as is the opposite end of the shaft 196.

Figure 15:
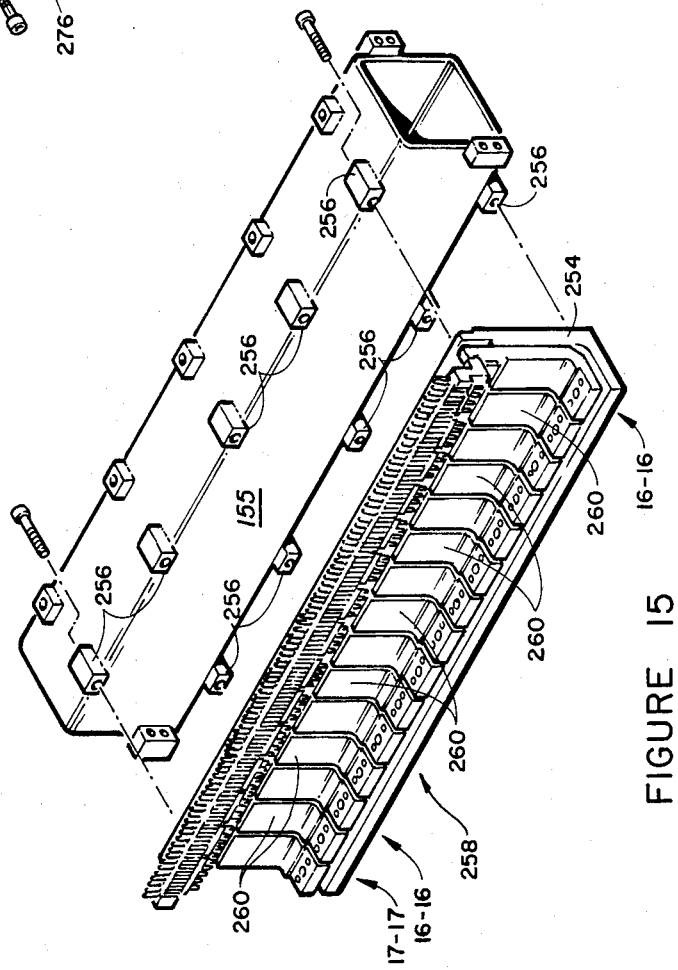
FIG. 15 is an exploded showing taken in the area indicated by the arrow 15—15 of FIG. 3.

Referring now to FIG. 15 which is an exploded showing of FIG. 3 taken in the area indicated by the arrow 15—15. The Figure shows, for the purpose of reference, the mainframe beam section 155 and a bracket 254 associated therewith. The bracket 254 is attached to the mainframe beam by means of attachment blocks 256 and screws threaded into the bracket through the attachment blocks 256. Shown attached to the bracket is a weld finger assembly 258 having fifteen weld fingers 260. The weld finger assembly is hereinafter discussed in more detail.

Figure 16:
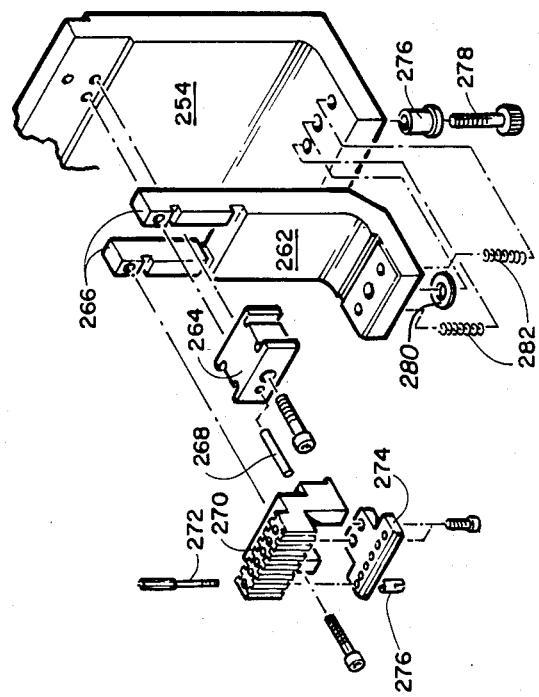
FIG. 16 is an exploded showing taken in the area indicated by the arrow 16—16 of FIG. 15.

Referring now to FIG. 16 which is an exploded showing of FIG. 15 taken in the area indicated by the arrow 16—16. The bracket 254 is shown for the purpose of reference. A finger bracket 262 is shown as nestable within the bracket 254. The finger bracket 262 is held in place by means of sliding block 264 which slidedly engages the two uprights 266 on the upper end of the finger bracket. A pin 268 is used for the purpose of alignment and a screw is used to secure the sliding block to the bracket 254. Attached to the upper distal ends of the finger bracket is a weld pin holder 270. The weld pin holder holds and positions a plurality of weld pins 272, one shown for explanation. The weld pins 272 pass through openings through the weld pin holder and through pin conductor 274 and are held in place by means of elongated weld pin nuts 276. Conductor 274 is held in place on the lower surface of the weld pin holder by a pair of screws. The bottom surface of the finger bracket is secured to the bottom inner surface of the bracket 254 by means of bushing 276 and shoulder bolt 278. A washer 280 is positioned between the finger bracket and the bottom surface of bracket 254. Springs 282 are positioned within adjacent apertures in the bracket 254 and finger bracket 262.

Referring now to FIG. 17 which is an exploded showing of FIG. 15 taken in the area indicated by the arrow 17—17. This showing is substantially the same as FIG. 16 except that the left most weld pin holder 284 has a greater width than weld pin holder 270. The weld pin holder 284 additionally carries a support pin 286 which is secured through an aperture in the weld pin holder and secured thereto by a nut and a wrap pin 288 attached in the same manner to the weld pin holder 284.

Figure 18:
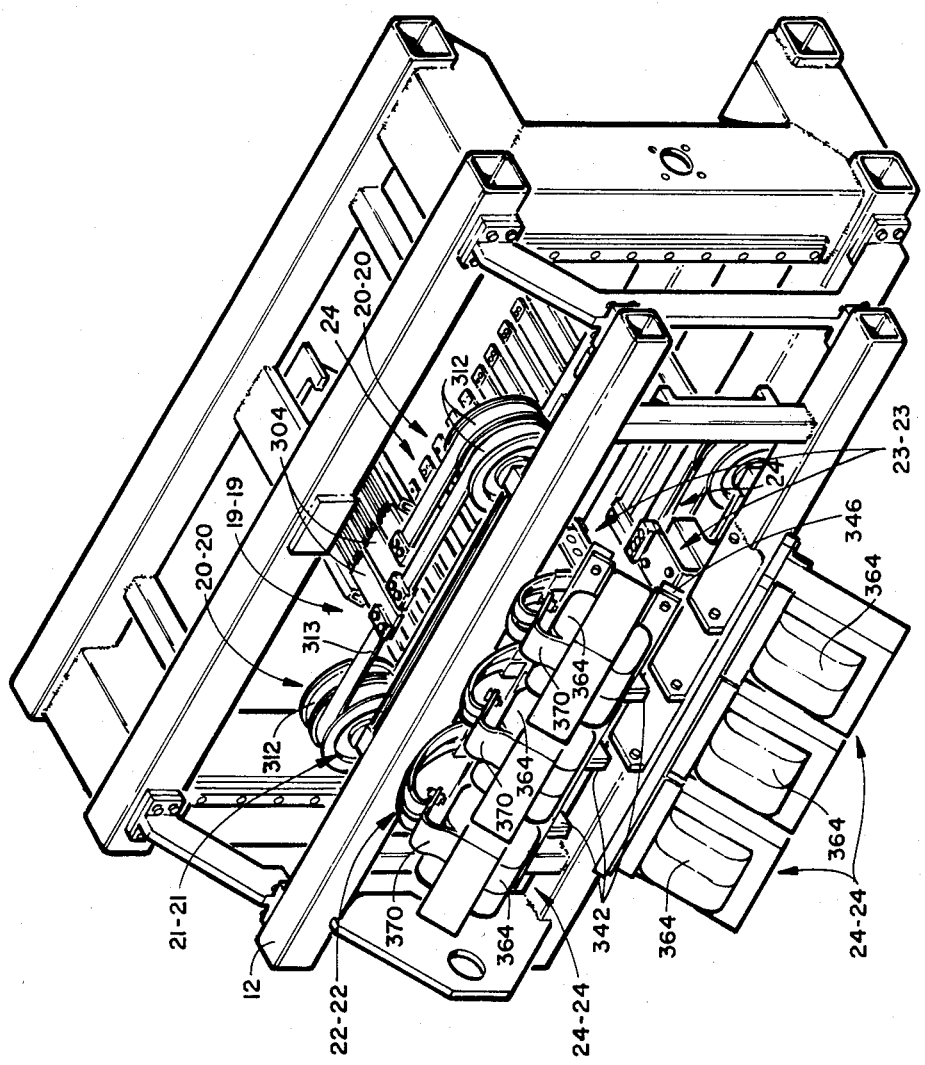
FIG. 18 is an exploded showing of the mainframe of the machine of the invention.

FIG. 18 is a perspective showing of the back portion of the mainframe. The various components shown will be hereinafter described in detail.

FIG. 19 is an exploded showing taken in the area indicated by the arrow 19—19 of FIG. 18. For reference a portion of the transport installation 14 is shown. A conductor support assembly including outstanding arms 292, mounting blocks 294 and a bracket 296 for attaching to the mainframe transport installation 14 is shown. An insulator 298 is attached to the mounting blocks 294 on the conductor support arms 292 by screws means. An insulator 302 is attached by screw means to the distal ends of the outstanding arms 292. Attached to the insulator 302 are a pair of conductors 304 and a conductor 306. A power cable 308 is removably attached to a conductor 306 by conventional screw means. Three transport straps 312, partially shown for purpose of reference, are attached respectively to conductor 304 and 306 by means of clamps 310 secured to the conductors by screw means.

Referring now specifically to FIG. 20 which is an exploded view taken in the area indicated by the arrow 20—20 of FIG. 18. The FIG. 20 showing is typical for two locations as shown in FIG. 18. A pair of pulley halves 312 are carried by a pintle 314. A bearing 316 is positioned on the outer surfaces of each of the two pulley halves 312. The pulley halves are secured one to the other by means of a plurality of screws. The two pulley halves are held to the pintle 314 by means of a bearing lock washer and a bearing lock nut 320. A pulley mount bracket 322, shown for the purpose of reference, is attached to the outer surface of the pintle 314 by means of a pair of screws. Also attached to the pulley mount bracket 322 is a bearing 324 by screw means. The straps 313 are shown in position on the two pulley halves.

Figure 21:
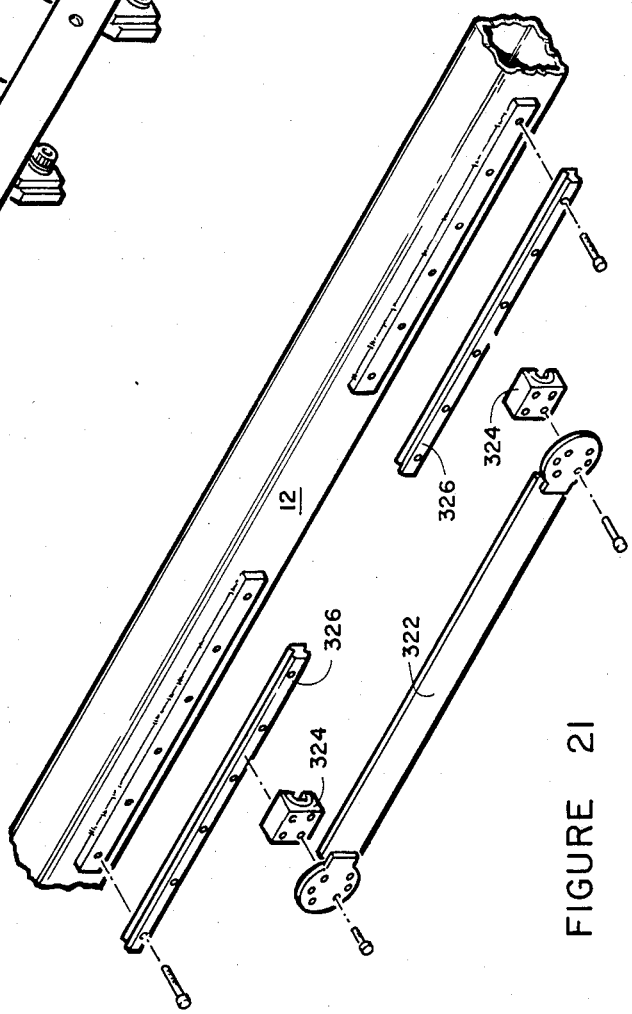
FIG. 21 is an exploded showing taken in the area indicated by the arrow 21—21 of FIG. 18.

Referring now to FIG. 21 which is an exploded showing taken in the area indicated by the arrow 21—21 of FIG. 18. An upper beam of main frame 12 is shown for reference. Attached by screw means to the mainframe are a pair of bearing ways 326. Bearings 324. The pulley mount 322 is shown in relationship to the bearings 324.

Figure 22:
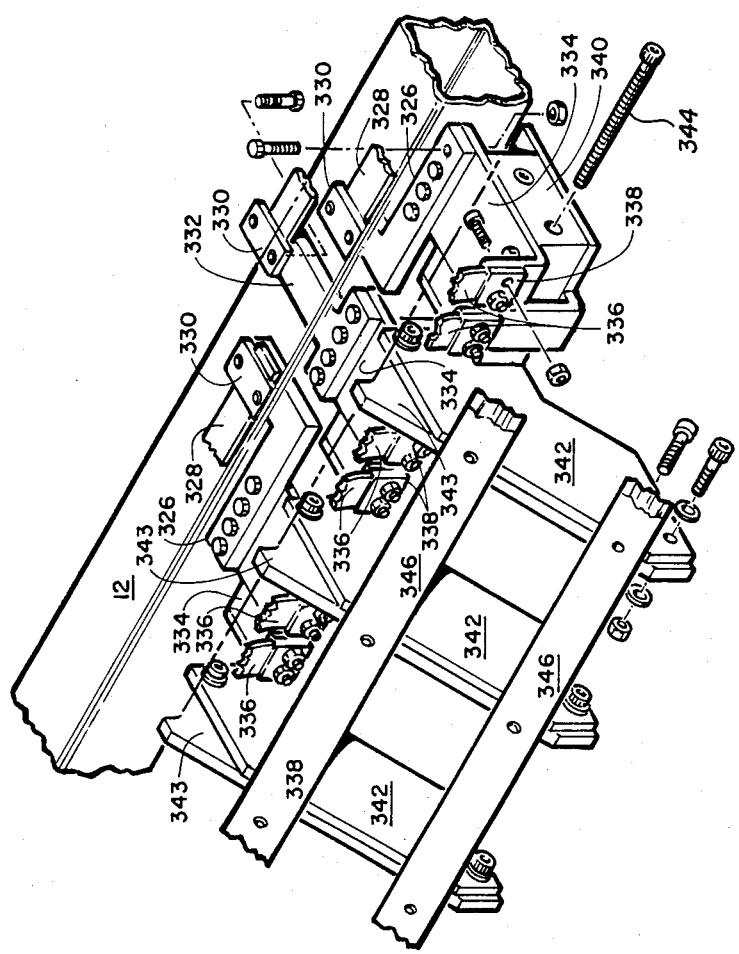
FIG. 22 is an exploded showing taken in the area indicated by the arrow 22—22 of FIG. 18.

Referring now to FIG. 22 which is a perspective showing taken in the area indicated by the arrow 22—22 of FIG. 18. The mainframe 12 is shown for the purpose of reference. Conductor 326, two shown and straps 328, associated therewith are attached to the mainframe by means of clamps 330 with screws passing therethrough and threaded into the mainframe. A conductor 332 and associated strap 328 are connected to the mainframe in a similar manner and are located between adjacent conductor 326. Conductors 334 and 335 are connected to conductors 326 and 332 by means of bolts and nut combinations. Straps 336 are connected in pairs to the conductors 334 by means of plates 338 and bolt and nut combinations. Positioned between the conductors 334 and 335 is a mounting block 340. The mounting block 340 is secured to mounting brackets 342 and 343 by means of long screws 344. The mounting brackets 342 and 343 are secured to each other and to adjacent mounting brackets 342 and 343 by brackets 346 by nut and bolt means.

Figure 23:
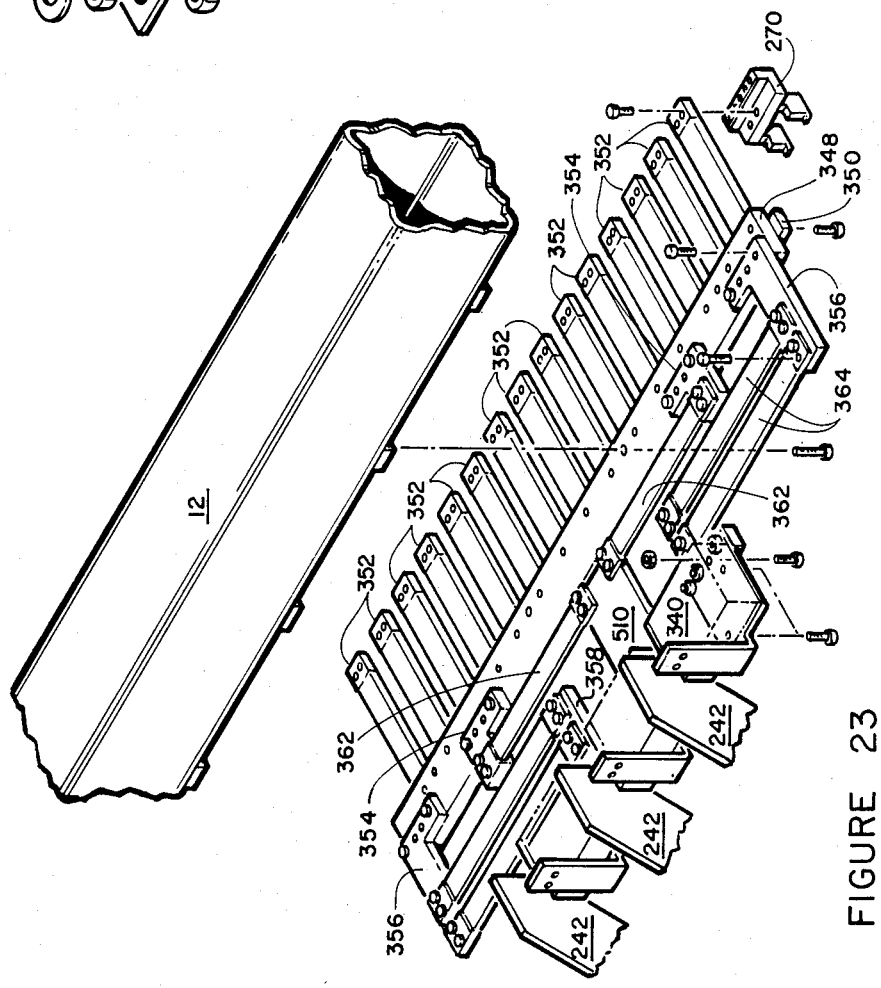
FIG. 23 is an exploded showing taken in the area indicated by the arrow 23—23 of FIG. 18.

Referring now specifically to FIG. 23 which is an exploded showing taken in the area indicated by the arrow 23—23 of FIG. 18. Mainframe 12 is shown as a point of reference. A bus bar 348 shown centrally in the Figure is attached to the bottom of the mainframe by screw means. Positioned between the bus bar 348 and a lower bus bar 350 are a plurality of straps 352. Attached to the distal ends of each of these straps are weld finger assemblies 270, 284, one 270 shown for location and it should be understood that the single weld assembly 284 is located at the opposite end with the remainder being of the 270 type as shown. Attached to the upper surface of bus bar 348 are conductors 354, 356, and 358. Connected between conductors 356 and 358 are a pair of straps 364. The above mentioned straps are attached by screw means. Mounting brackets 342 are shown in part for location reference.

Figure 24:
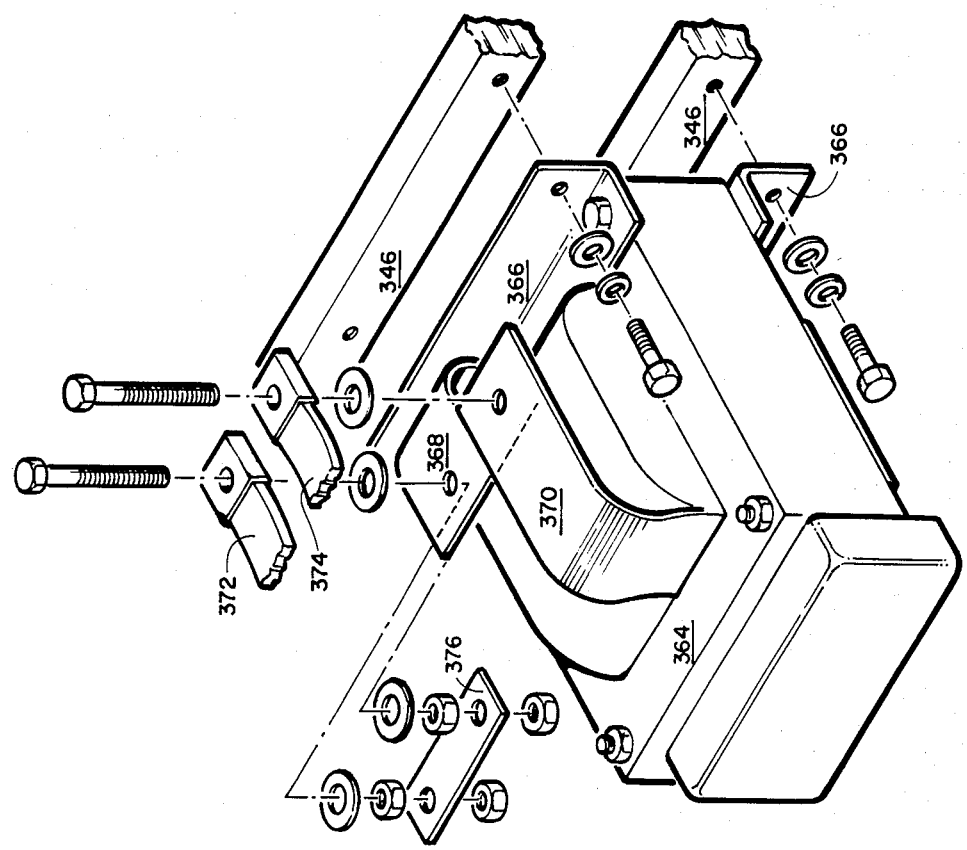
FIG. 24 is an exploded showing taken in the area indicated by the arrow 24—24 of FIG. 18.

Referring now to FIG. 24 which shows an exploded view of FIG. 18 taken in the area indicated by the arrow 24—24 and rotated 45° therefrom. A pair of mounting bars 346 hereinbefore shown are additionally used to mount a welding transformer 364 to the mainframe. The transformer 364 is mounted to the mounting bars 346 by means of attached brackets 366. The connectors are conventional nut and bolt combinations. Attached to electrodes 368 and 370 are conductors 372 and 374 respectively. The attachment is made as shown by use of an insulator 376 and nut, bolt and washer combination.

Referring again to FIGS, 1, 2, 4 and 5 which show the transport installation taken from several views. As aforementioned the transport installation 14 consists of several general areas, namely, an index assembly 26, the weld wheel assembly 28 and the spreader assembly 30. More specific details of the general areas will be hereinafter explained in more detail.

Figure 25:
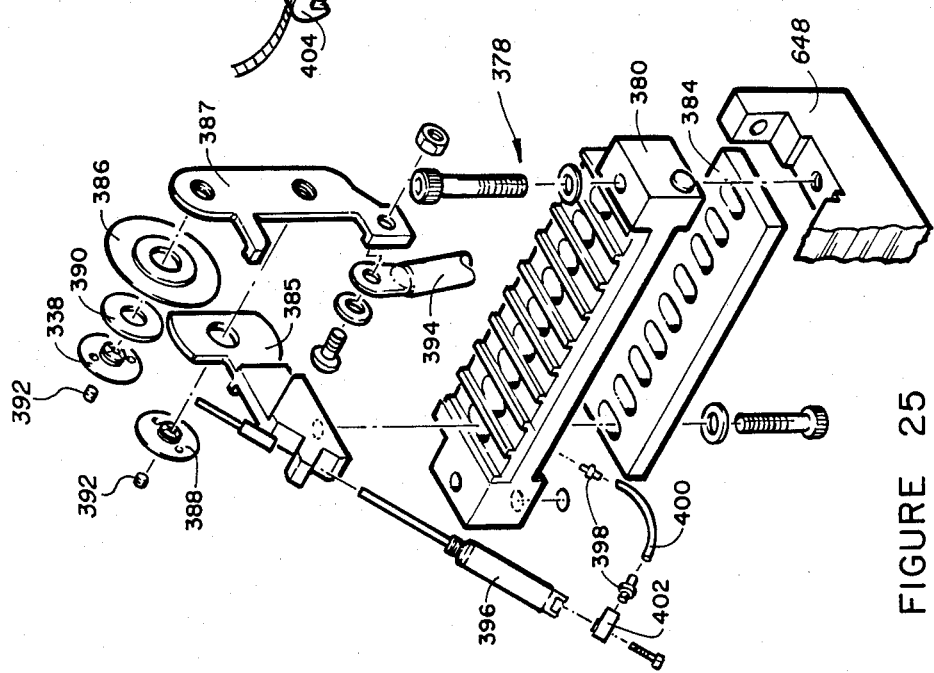
FIG. 25 is an exploded showing taken in the area indicated by the arrow 25—25 of FIG. 5.

Referring now specifically to FIG. 25 which is an exploded view taken in the area indicated by the arrow 25—25 of FIG. 5. This Figure is directed to the weld wheel assembly 378. The assembly includes a wheel mount assembly 380 which is mounted to a wheel carrier mount bracket assembly 382 with an insulator block 384 positioned therebetween to isolate the wheel mount assembly from ground potential. The combination wheel mount bracket assembly 382, insulation block 384 and a wheel mount assembly 380 are secured by means of screws shown. A wheel carrier assembly 387 is connected to a weld wheel 386 by a wheel retainer 338, spacer 390 and central allen screw 392. Likewise the wheel carrier is connected to the wheel mount 385 by means of a like retainer 388 and allen screw 392. Electrical power for welding is connected to the wheel 386 through power cable 394 which is connected to an aperture in the bottom portion of the wheel carrier by bolt and nut means. The wheel is rotated between its weld and no weld positions by an air cylinder 396 which is connected to a source of air under pressure through connectors 398 and tube 400 connected to elbow connector 402 on the cylinder.

Referring now specifically to FIG. 26 which is an exploded showing of FIG. 5 taken in the area indicated by the arrow 26—26. The transport index assembly 26 carries foil guides 404 and and guide supports 408 and 410 respectively. A pair of bearing rail carriers 412 and 414 are shown. Bearing rail carrier 414 is slotted at location 416 to receive the bearing 418 of crank 420. The slot 416 is lined with wear plates 422, one shown, for the bearing 418 to alternatively ride up and down therein for the purpose hereinafter explained in more detail. Two bearing rail mounts 424 are connected at their ends to ends to frame members 412 and 414. A bearing way 426 is attached to the bearing rail mounts 424, one shown. A pair of air operated cylinders 428 are shown attached to the bearing rail carriers. These cylinders will be more specifically discussed below. A foil guide adapter 430 is fixedly secured to a rail 432 by screws. The foil adapter assembly 434 will be more fully disclosed in the exploded view of FIG. 29. Carried on the upper surface of the bearing rail mount 424 is a cam roller assembly 436. The cam roller assembly is attached to the rail mount by means of a locator pin 438 and a pair of screws. The cam roller assembly includes a roller housing 440 which houses a pair of cam rollers 444. The foil guide support 410 is connected to cam plate 446 and foil guide 408 is connected to guide 410.

Referring now specifically to FIG. 27 which is an exploded showing of FIG. 5 taken in the area indicated by the arrow 27—27. A chopper carrier 448 is attached to the transport mechanism frame assembly by means of screws. The lower end of the chopper carrier 448 has two slots for receiving a pair of choppers 450. The choppers 450 when installed on the chopper carrier by screw means are flush with their receiving side of the chopper carrier and extend in opposite directions from each other. A sensor base 452 mates with the transport frame assembly and is held by screw means. Attached to each side of the sensor base by screw means are a pair of optical sensors 454 A–D. The sensors 454 A–D include mounting brackets 455 and electrical connectors 457.

Referring now specifically to FIG. 28 which is an exploded showing of FIGS. 3 and 5 taken in the area indicated by the arrow 28—28. This showing depicts the transport assembly 14 in relationship to the mainframe assembly 12. Attached to the transport assembly frame is a chopper carrier mount 456. A chopper carrier 458 is attached to the mount by screw means. A chopper 460 is attached to the lower surface of the chopper carrier by screw means. The chopper 460 is directed inward to engage with a plurality of sensors 462 A–E. The sensors are attached in a spaced apart relationship to a sensor mount 464. The sensor mount is connected to the bottom front surface of the mainframe beam by screws which pass through slotted openings in the sensor mount 464. The slots allow for longitudinal adjustment of the sensors along the mainframe beam. A pin keeps the sensor mount to the mainframe beam when it is properly located.

Figure 29:
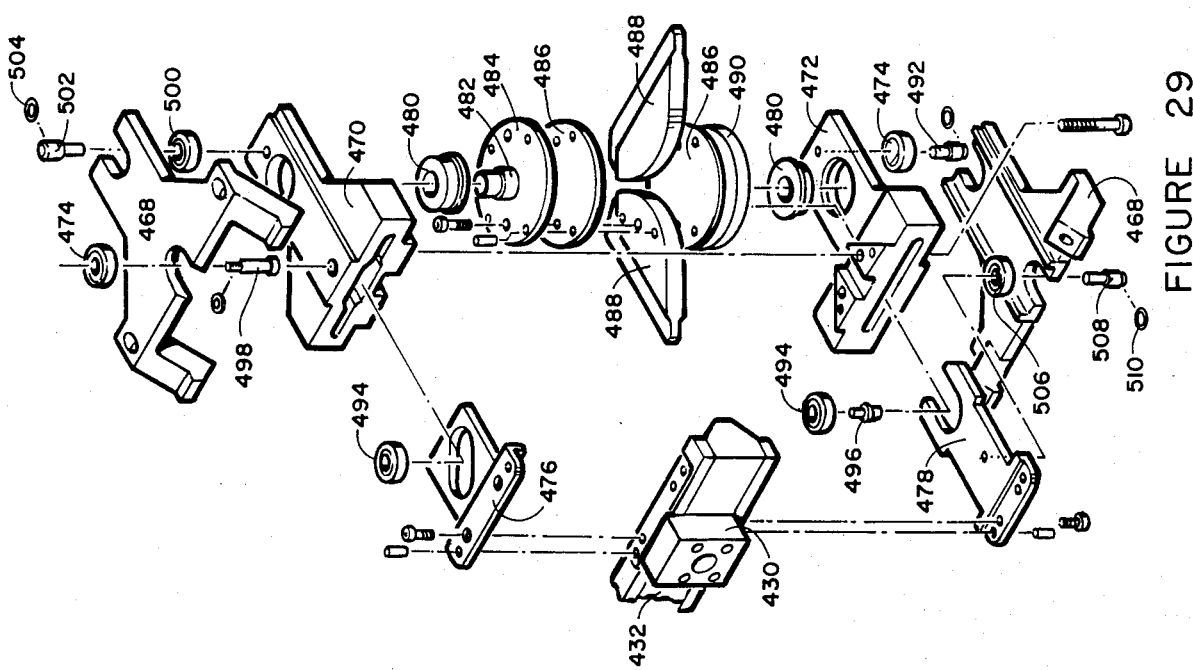
FIG. 29 is an exploded showing taken in the area indicated by the arrow 29—29 of FIG. 26.

Referring now specifically to FIG. 29 which is an exploded showing of FIG. 26 taken in the area indicated by the arrow 29—29. This Figure depicts the foil adapter assembly 434. The foil adapter assembly comprises slide plates 468 positioned on each vertical end thereof. The slide plates are adapted to mesh with the adjacent surfaces of the bearing carriers 470 and 472. The bearing carriers receive ball bearings 474 carried by cam plates 476 and 478. A flanged bearing 480 meshes with openings in both bearing carriers. A shaft 482 centered on a plate assembly 484 meshes with and carries the flange bearing 480. A wear plate 486 is interconnected between the shaft 482 and the upper surface of a pair of wipers 488. A second wiper plate 486 is positioned adjacent the lower surface of the pair of wipers 488. The lower most wear plate 486 is attached to an eccentric shaft. The shaft (not shown) is mounted on the bottom surface a plate 490 like shaft 482, except the eccentric shaft is positioned off center relative to the center of its associated plate. The eccentric shaft mates with the center of the lower flange bearing 480. The second roller bearing 474 is carried by a stub shaft 492. The shaft 492 is retained by a retainer ring at its lower end and is press fitted into the roller bearing and the roller bearing is press fitted into carrier 472. Cam plates 476 and 478 are carried on opposite sides of rail 432 and are attached thereto by screw and pin means. A ball bearing 494 is carried in the inward directed opening of cam plates 476 and 478. The lower bearing 494 is supported by a stub shaft 496. The upper bearings 474 and 494 are held in alignment by a common shaft 498 and a retainer ring. A second slide plate upper bearing 500 engages slide plate 468 and is secured to bearing carrier by stub shaft 502 and locking ring 504. Lower slide plate bearing 506 is likewise held in place by stub shaft 508 and lock ring 510.

Figure 30:
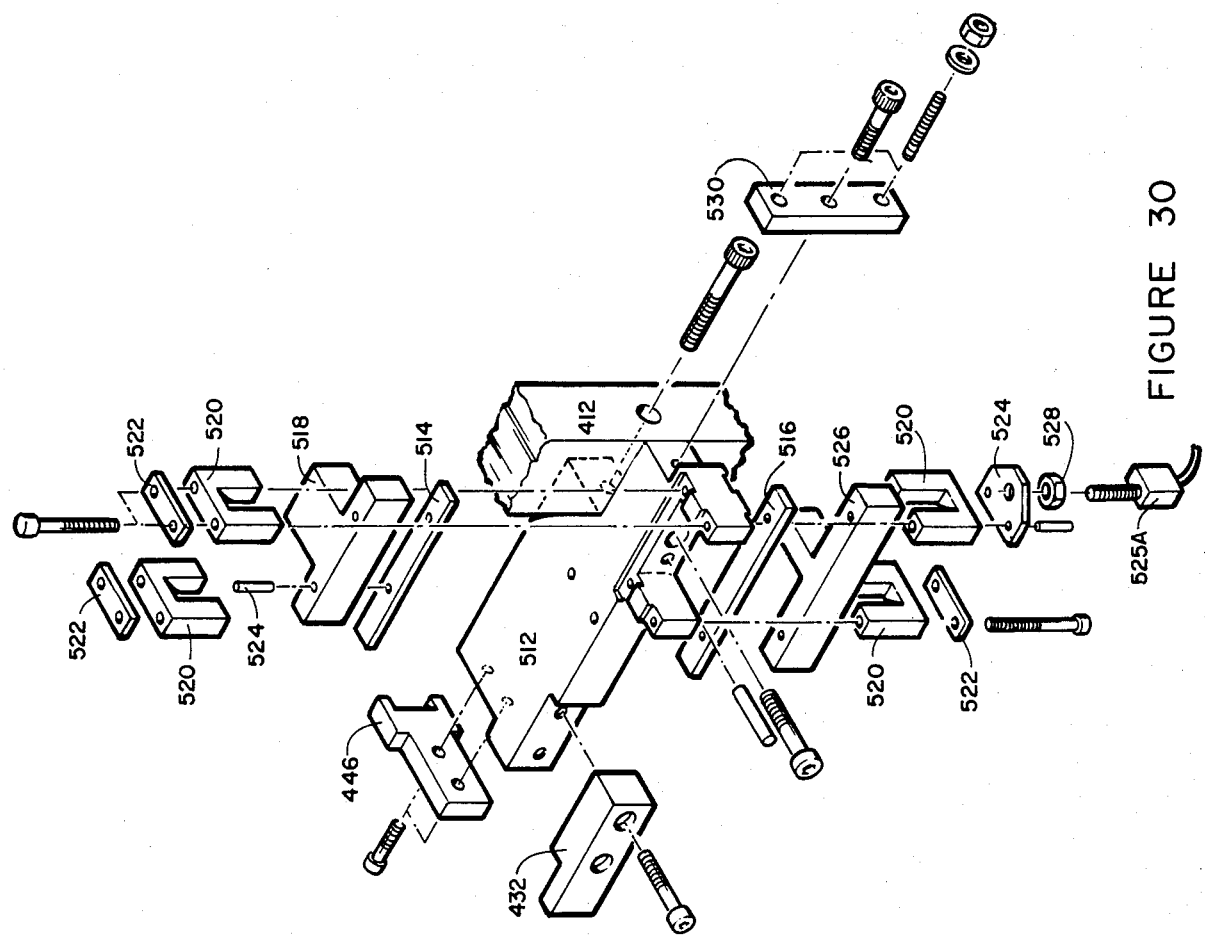
FIG. 30 is an exploded showing taken in the area indicated by the arrow 30—30 of FIG. 26.

Referring now specifically to FIG. 30 which is an exploded showing of FIG. 26 taken in the area indicated by the arrow 30—30. Bearing rail carrier 412 is shown for the purpose of reference. Bearing carrier 512 is attached to the bearing rail carrier 412 by screw means. The cam plate 446 is attached to the inboard end of the bearing carrier 512. Attached to the upper surface of the bearing carrier is a rail 514 and on the bottom surface a rail 516. A "T" shaped rail actuator lever 518 is positioned over each "T" surface. On the upper surface of the rail bearing is a spacer 522. The combined rail 514, "T" shaped rail actuator lever 518, rail bearings 520 and spacers 522 are secured to the bearing carrier by screw means. A pin 524 is used to align the rail and rail actuator lever. On the under surface of the bearing carrier 512 is a like combination of equivalent parts as described for the upper surface. The only difference being that in place of one of the spacers 522 is a switch mount 524 which provides the spacer function and allows for the mounting of magnetic switches 525A and 525B and the "T" shaped rail actuator lever 526 takes a slightly different configuration then rail actuator lever 518. The switch 525A is attached to and positioned relative to switch mount by means of a nut 528 when threaded into an aperture in the switch mount. The end of the bearing carrier 512 opposite from the location of the cam plate 446 and adjacent to bearing carrier mount 412 is a stop plate 530. A set screw nut and washer combination is used in the upper and lower aperture through the stop plate 530 to adjust the exact stop location of the transport assembly relative to the main frame rail on which it translates. A screw through the center stop plate aperture secures the stop plate to the bearing mount.

Figure 31:
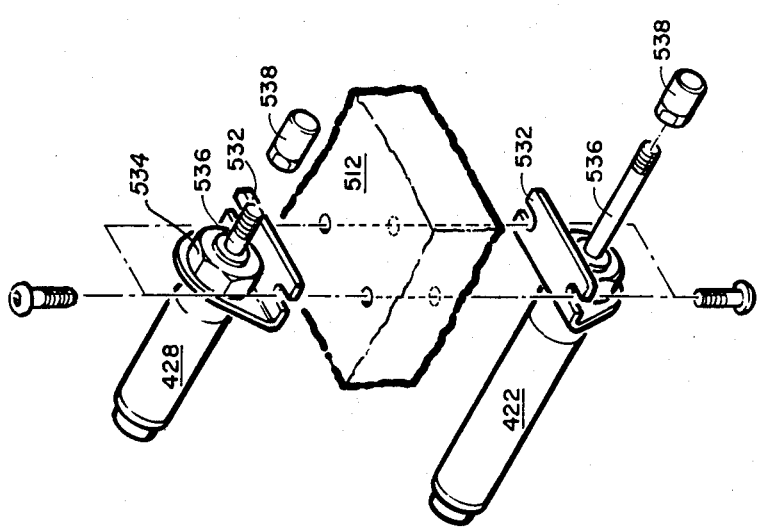
FIG. 31 is an exploded showing taken in the area indicated by the arrow 31—31 of FIG. 26.

Referring now specifically to FIG. 31 which is an exploded showing of FIG. 26 taken in the area indicated by the arrow 31—31. Centrally shown is the bearing carrier 512 for the purpose of reference. Positioned on the top and bottom surface of the bearing is an air cylinder bracket 532 which is attached by screw means. The air cylinder 428 is secured to the upright portion of the air cylinder bracket 532 by means of threaded end and jam nut 534. Each piston 536 has a stop 538 at its distal end.

Figure 32:
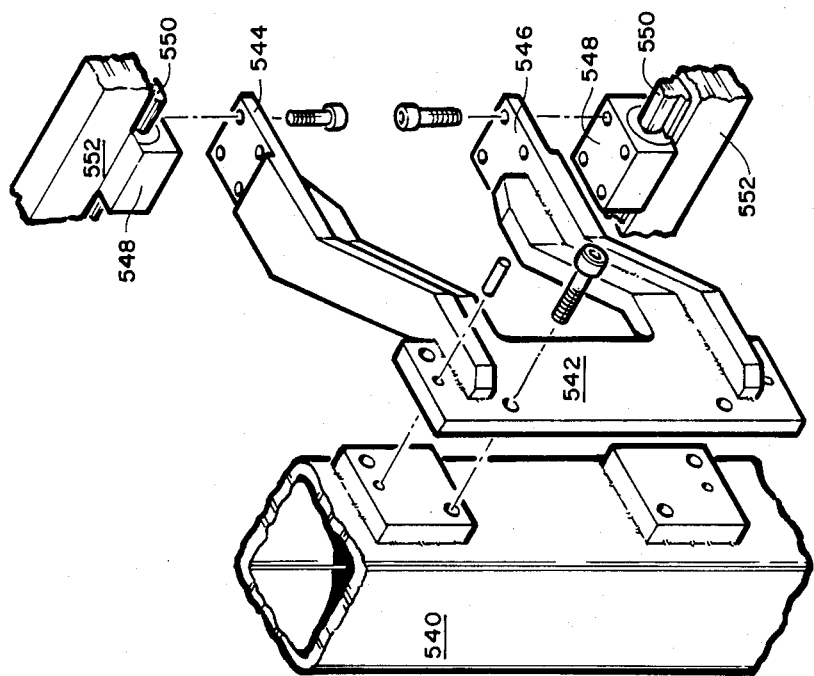
FIG. 32 is an exploded showing taken in the area indicated by the arrow 32—32 of FIG. 5.

Referring now specifically to FIG. 32 which is an exploded showing of FIG. 5 taken in the area indicated by the arrow 32—32. The transport frame 540 is shown for reference. Attached to the transport frame 540 is a spreader support bracket 542 which has two upward outstanding arms 544 and 546. A bearing 548 is attached to the outer surfaces of the arms 544 and 546. Each bearing being directed away from the other. The bearings are attached by machine screws. The bearings 548 engage and ride along rails 550 mounted on railing ball mounts 552 carried by the mainframe. The opposite side of the transport assembly 14 has a similar spreader support bracket and associated components. The various components are inner attached as noted.

Referring now specifically to FIG. 33 which is an exploded showing of FIG. 5 taken in the area indicated by the arrow 33—33. This detailed showing is of the transport assembly drive mechanism. The drive assembly includes a right angle drive speed reducer 554 which is attached to the transport assembly frame by mounting bracket 556. The mounting bracket and reducer are attached by screw means. The right angle speed reducer has an axle shaft which in turn carriers crank 420 and cam 418. The opposite end of the axle shaft 558 includes a pin 560 fixedly attached thereto which carries a chopper 562 attached by means of allen screw. The chopper has an extension 566. Mounted on the chopper side of the right angle speed reducer are a pair of opposing sensors 568A and 568B. The sensors are slotted for receiving the chopper. The sensors are carried by sensor mounts 570 which are attached to the right angle speed reducer. The rotation of the chopper 562 activates the sensors as hereinbefore described in more detail. The driven axle 572 of the right angle speed reducer has a timing pulley 574 attached. A D.C. servo motor 576 is attached to motor mount 578 which is attached to the driven shaft end of the right angle speed reducer. One end of motor shaft 580 is attached to a second timing pulley 582. A timing belt connects the two timing pulleys thus when motor 576 is activated the crank 420 is operated. On the opposite side of the motor the motor shaft 580 (not shown) is attached to a coupling 582 which connects the motor operation also drives the central shaft of the resolver 96. A resolver mount 588 attaches the resolver to the housing of motor 576. A motor closure 590 is attached to the resolver side of the motor by means of stand offs 592 (one shown) and suitable screws. The reducer mount 566 is attached to the transport assembly frame.

Referring now specifically to FIG. 34 which is an exploded showing taken in the area indicated by the arrow 34—34 of FIG. 5. This is a showing of the weld head drive bearing mount assembly. The transport index frame is shown for reference. A weld head bearing housing 594 is attached to the transport index frame 734 by alignment dowels and screw means. Attached to the top of the weld head drive bearing 594 is a weld head drive bearing cap 596 similarly attached by screws.

Figure 35:
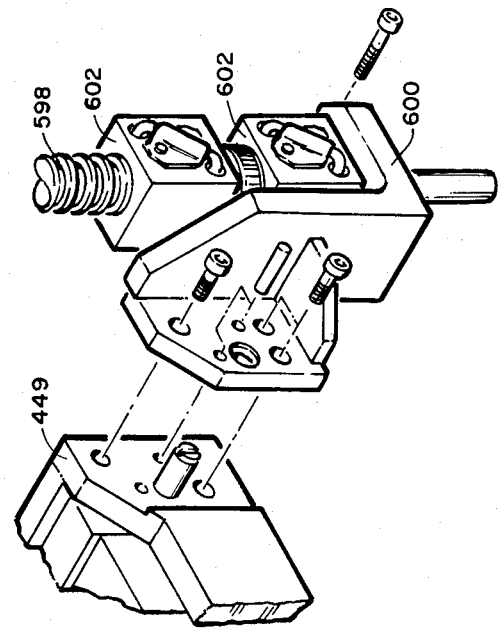
FIG. 35 is an exploded showing taken in the area indicated by the arrow 35—35 of FIG. 5.

Referring now specifically to FIG. 35 which is an exploded showing of FIG. 5 taken in the area indicated by the arrow 35—35. This is a showing of the ball nut assembly associated with ball screw 598. The upper and lower ball nut assemblies are identified, so only the lower assembly is shown for ease of explanation. A ball nut mount 600 is attached to the weld assembly 449 shown for reference by pin and screw means. A pair of ball nuts 602 are shown at the end of ball screw 598.

Figure 36:
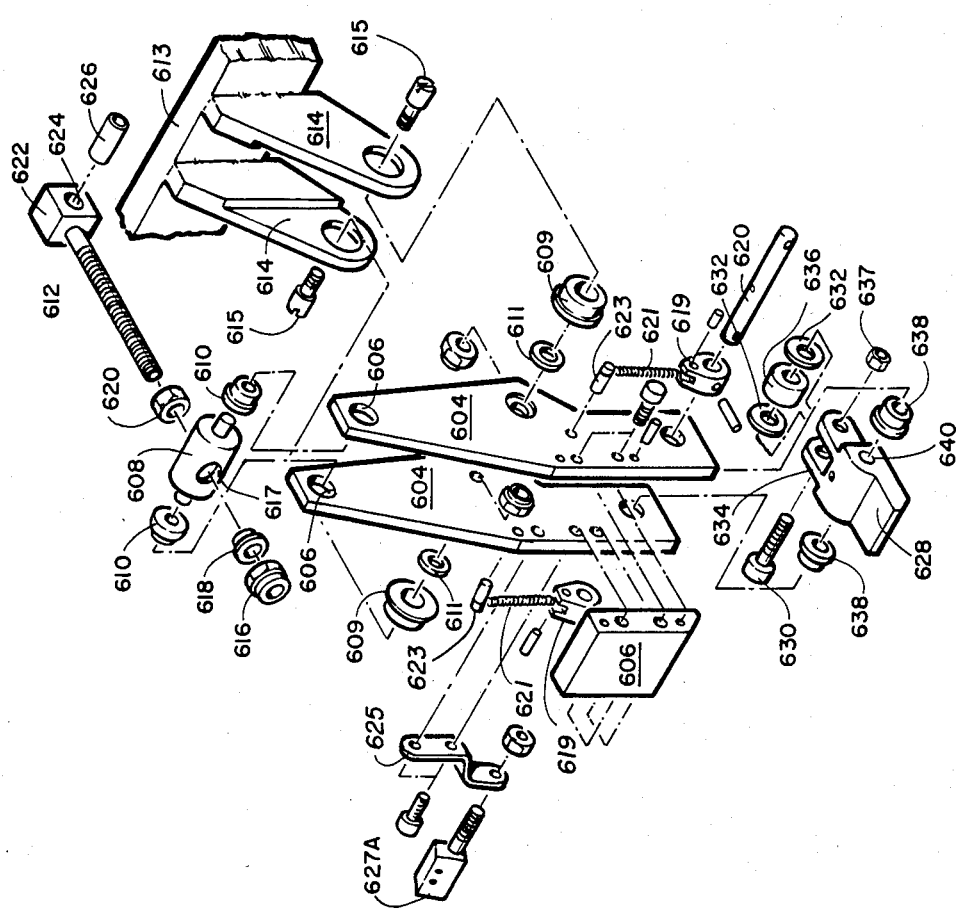
FIG. 36 is an exploded showing taken in the area indicated by the arrow 36—36 of FIG. 5.

Referring now specifically to FIG. 36 which is an exploded showing taken in the area indicated by the arrow 36—36 of FIG. 5. This is a showing of the lower weld wheel control. It should be understood that the upper wheel control is the same as the lower and its description will, therefore, not be discussed. A pair of slide plates 604 are spaced apart by space block 607. Attached to each slide plate is a pair of flange bearings 609 and shaft spacers 610 which are attached to the frame attachment 612 by means of outstanding arms 614 by stub shafts 615. Also positioned on the outside surface of the slide plates are spring arms 619 held in place by means of shaft 620. The spring arms are locked to shaft 620 by pin means. The upper surface of the spring arms connect through springs 621 to spring anchors 623 attached to the slide plates. Attached by bolt means to the left most slide plate is a switch mount 625. A magnetic switch 627 (627A lower and 627B upper) is attached to the switch bracket by a thread end/nut combination. The upper ends of the slide plates 604 include apertures 606 for receiving a flange bearing 608 therebetween. The flange bearing is supported in the apertures by bushings 610. A swing bolt 612 is attached through aperture 617 by means of lock nut 616, spring seat 618 and an inner nut 620. The head 622 of the swing bolt includes an aperture 624 for receiving a headless liner bushing 626. A close tolerance bolt 630 passes through one outstanding ear 634 of follower link 628, though a spacer 632 through a cam follower 636, a second spacer 632 and through the other outstanding ear 634 where the bolt engages a nut 637. The follower link 628 is pivotally attached to the slide plate ends by means of a pair of head liner bushings 638 as spacers which are positioned on each side of the follower link which receives shaft 620 as does the aperture 640 through the follower link. The follower link is attached to the shaft by a dowel.

Figure 37:
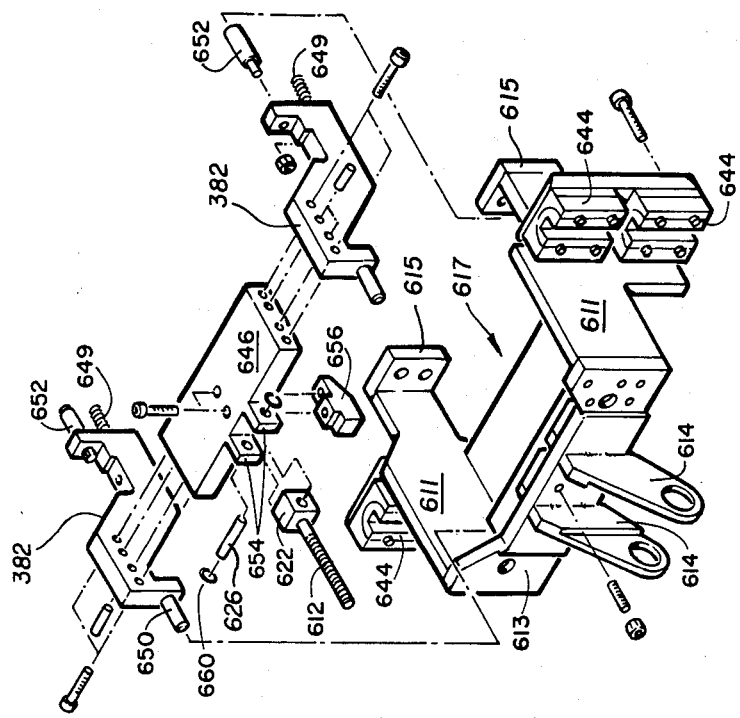
FIG. 37 is an exploded showing taken in the area indicated by the arrow 37—37 of FIG. 5.

Referring now specifically to FIG. 37 which is an exploded showing of FIG. 5 taken in the area indicated by the arrow 37—37. On each side of the frame assembly 617, and side brackets 611, are positioned a pair of bearings 644. These bearings are attached to the frame assembly by screw means and mate with the bearing ways 736 (see FIG. 40). Attached to the frame assembly is a plate 646. The plate 646 is held in position by means of wheel mount plates 382, which are secured to the plate 646 by screw and dowel means. The wheel mount plates 382 are translateably connected to the front plate 613 and at the rear of side bracket 611 by means of stub shafts 650 and 652 respectively slideably fitted to apertures located in 613 and 615. Springs 649 are held in position between arm 615 and the rear of side brackets 382, recesses are provided. The springs 649 bias the plate 646 toward the front of the machine (toward plate 613). The plate 646 includes a pair of outstanding arms 654 for receiving swing bolt 612 (see FIG. 36). The swing bolt is pivotably attached to the front of plate 646 by means of a shaft 626 and shaft retainer rings 660. Attached to the bottom of plate 646 is a stop member 656.

Figure 38:
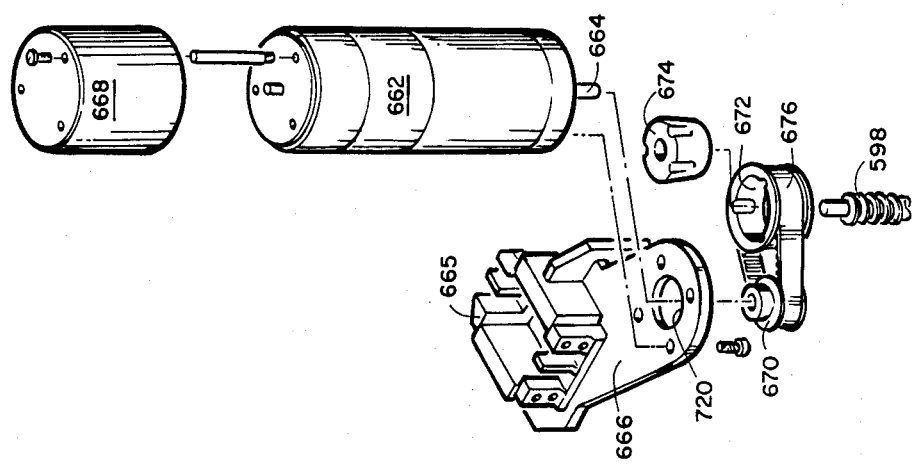
FIG. 38 is an exploded showing taken in the area indicated by the arrow 38—38 of FIG. 5.

Referring now specifically to FIG. 38 which is an exploded showing taken in the area indicated by the arrow 38—38 of FIG. 5. A D.C. servo motor 662 having a central drive shaft 664 is mounted to the frame by index housing mount 666. A motor enclosure 668 fits over the outer end of the motor and is secured to the motor frame by stand off means hereinbefore discussed. A timing pulley 670 is fixedly attached to one end of motor central drive shaft 664. The ball screw 598 is attached to a second timing pulley 672 via a taper lock bushing 674. A timing belt 676 connects the timing pulley. The operation of D.C. servo motor 662 rotates the ball screw 598.

Figure 39:
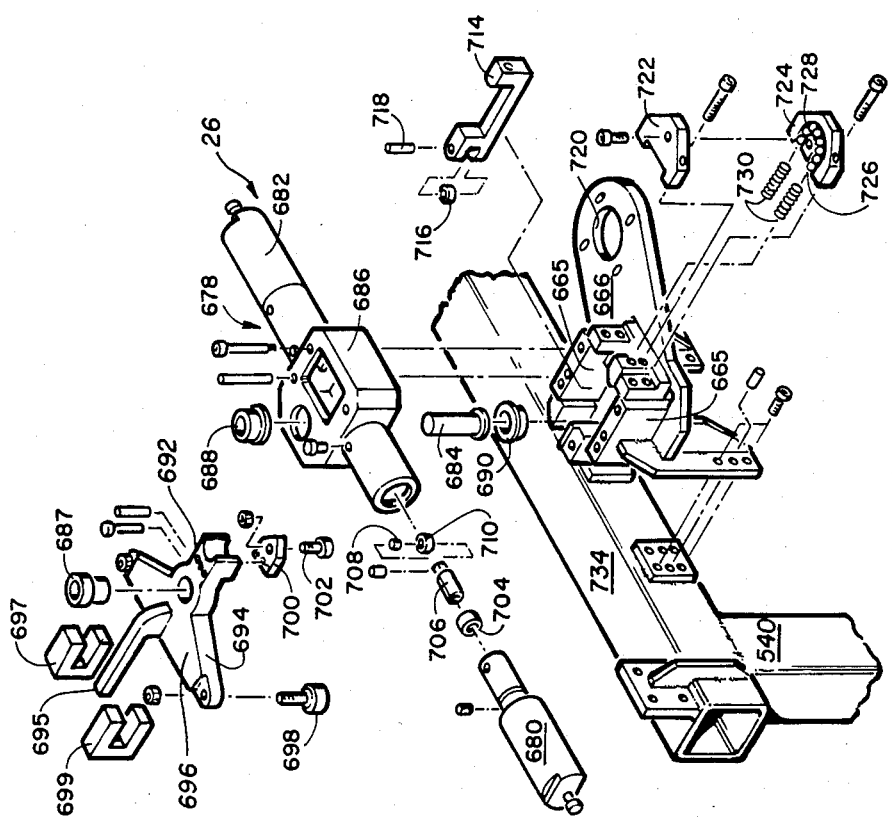
FIG. 39 is an exploded showing taken in the area indicated by the arrow 39—39 of FIG. 5.
Figure 40:
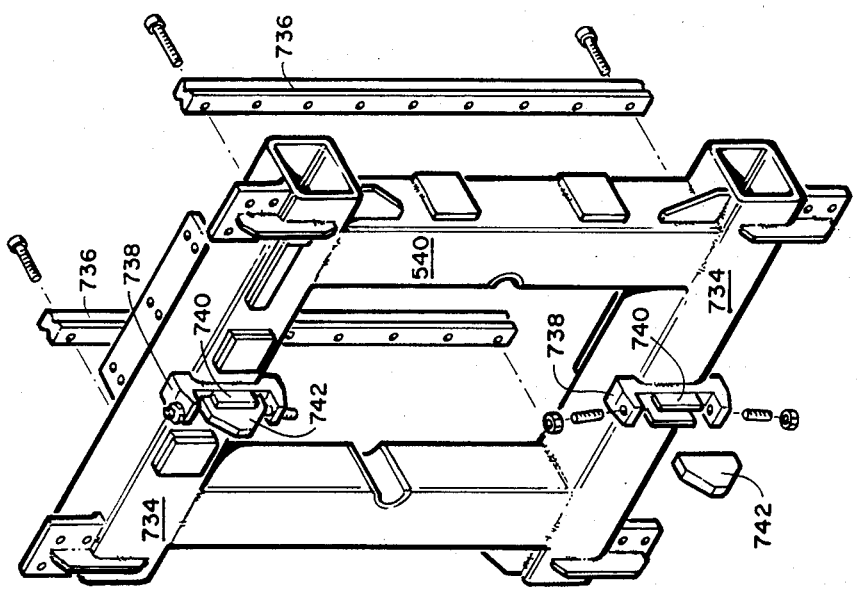
FIG. 40 is an exploded showing of the frame assembly of the transport of FIG. 5.

Referring now specifically to FIG. 39 which is an exploded showing the transport index assembly 14 of FIG. 5 taken in the area indicated by the arrow 39—39. The index assembly is attached to the upper frame member 734 (on the foremost side of the FIG. 40 showing) of the transport index assembly by index housing mount 666. Attached to the upper surface of the center portion of the index housing mount is a cylinder assembly 678. The cylinder assembly comprises opposing cylinders 680 and 682. A shaft 684 is positioned within the housing 686 positioned between the cylinders and is held in position at its upper end by ball bearing 688 and at its lower end by a needle bearing 690. Engaging the shaft 684 is a semicircular protruding end surface 692 of a rocker arm 694. On each of the outer arms 694 is positioned a cam follower 698 is held in place by threaded ends passing through apertures in the end surfaces 692 and held in place by nut means. Attached to the bottom surface of the outer concave end 692 of the rocker arm 694 is a plate 700 held in position by screw and pin means. A cam follower 702 is attached to the outer end of plate 700 in the same manner as cam follower 698. Mounted on the outer surface of the rocker arm 694 is an extension 695 which activates either of two sensors 697 and 699 the purpose of which is hereinafter described in more detail. The cylinder 680 includes a jam nut 704 positioned around a plunger 706 which includes a drill bushing 708 and a needle bearing 710 which is inserted and held to the cylinder by means of an allen screw. A detent 714 which includes a needle bearing 716 that is positioned within an opening in the detent and held in place by a pin 718. On the outer end of the index housing mount 666 is an aperture 720 for mounting the ball drive motor 662. A ball transfer housing 722 is attached to the index housing by screw means. Attached to the index housing and ball transfer housing is a second ball transfer housing 724. Positioned within a half rail (not shown) that mates with a second half rail 726 of the ball transfer housing is positioned a plurality of steel balls 728. A pair of springs 730 of the heavy duty type are positioned on each side of the ball rails and secures the steel balls in close proximity.

Referring now specifically to FIG. 40 which is an exploded showing of frame assembly of the transport. The transport frame comprises vertical and horizontal frame members 540 and 734 respectively. The vertical frame members carry bearing ways 736 which mates with the openings in bearings 644 (see FIG. 37). Centrally positioned on the horizontal frame member are cam mounts 738. Outer cam mount arms 740 receive and position a cam 742 therebetween. The cams are held in place by allen screws and nut combination. These cams 742 are used to engage cam 636 of cam roller 628 for translating the weld wheel electrodes carrier mount inward and outward via the movement of swing bolt 612 when the ball screws 598 translate the assembling 617. The cylinders 396 rotated the weld wheels into and away from the weld finger assembly 18 after the assemblies 617 has been translated toward each other and immediately after the weld has been performed prior to return movement of the assemblies (see the discussion under the explanation of FIG. 25.

Figures 41, 42:
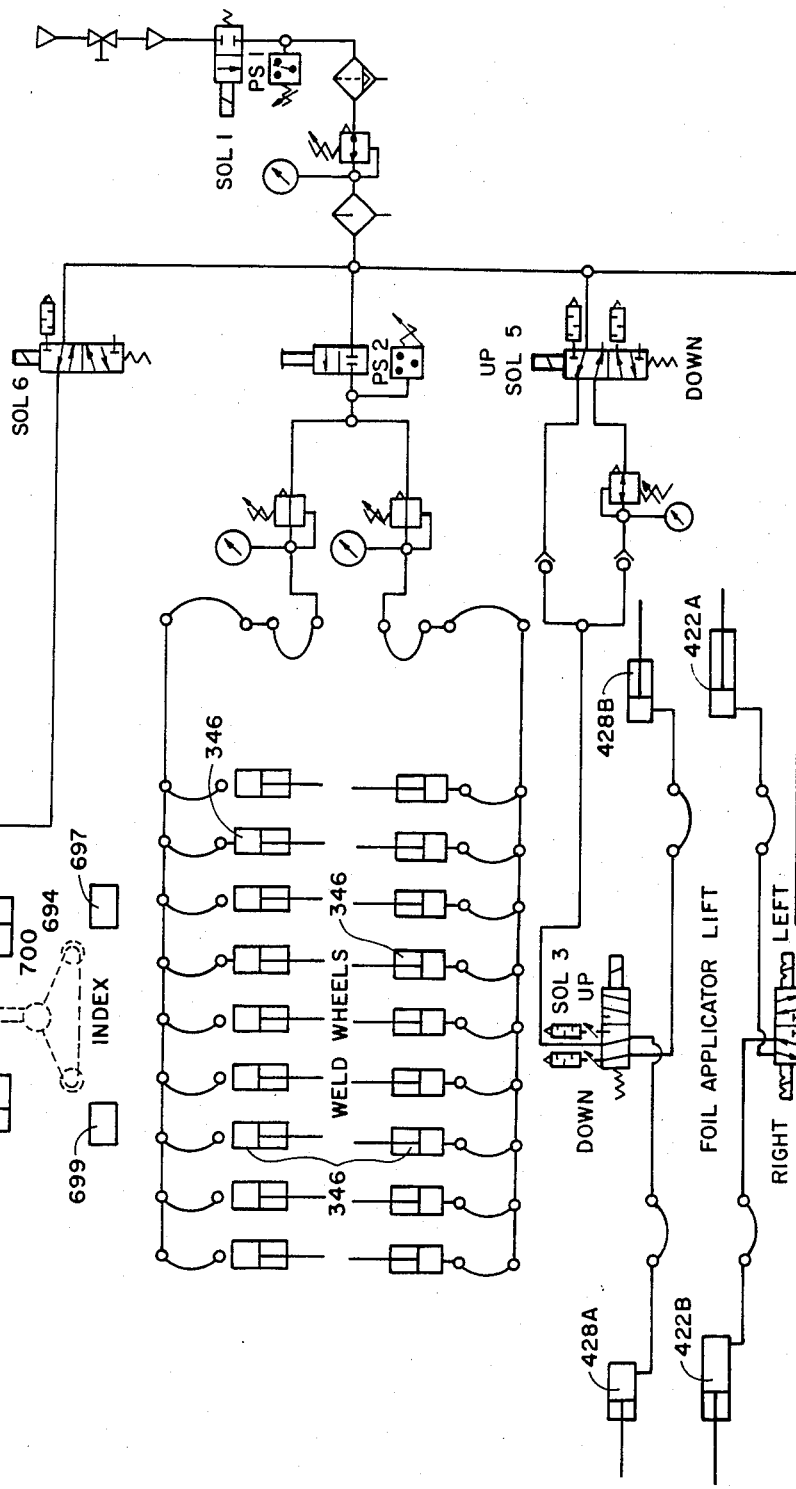
FIG. 41 is the pneumatic schematic of the machine operation.
FIG. 42 is a logic table for the pneumatic operation of the machine.

Referring now specifically to FIGS. 41 and 42 which depict the pneumatic schematic of the machine operation and the logic table for pneumatic solenoid operation. As shown by the logic table to initiate start, solenoids SOL 1, SOL 6, SOL 7 and SOL 8 are energized providing an air flow path and switches 1 and 2 are activated. For indexing the transport index 694 toward the right, the solenoids SOL 1, SOL 7 and SOL 8 are energized and switches 1 and 2 are activated. To reverse the direction of travel of the index assembly, solenoids SOL 1-6 are energized and switches 1 and 2 are activated. When the transport assembly 14 reaches the end of travel in either direction solenoids SOL 1, SOL 2, SOL 4 and SOL 6 are energized and switches 1 and 2 are activated. When transport travel toward the left is desired solenoids SOL 1, SOL 3 and SOL 4 and switches 1 and 2 are activated.

Figure 43A:
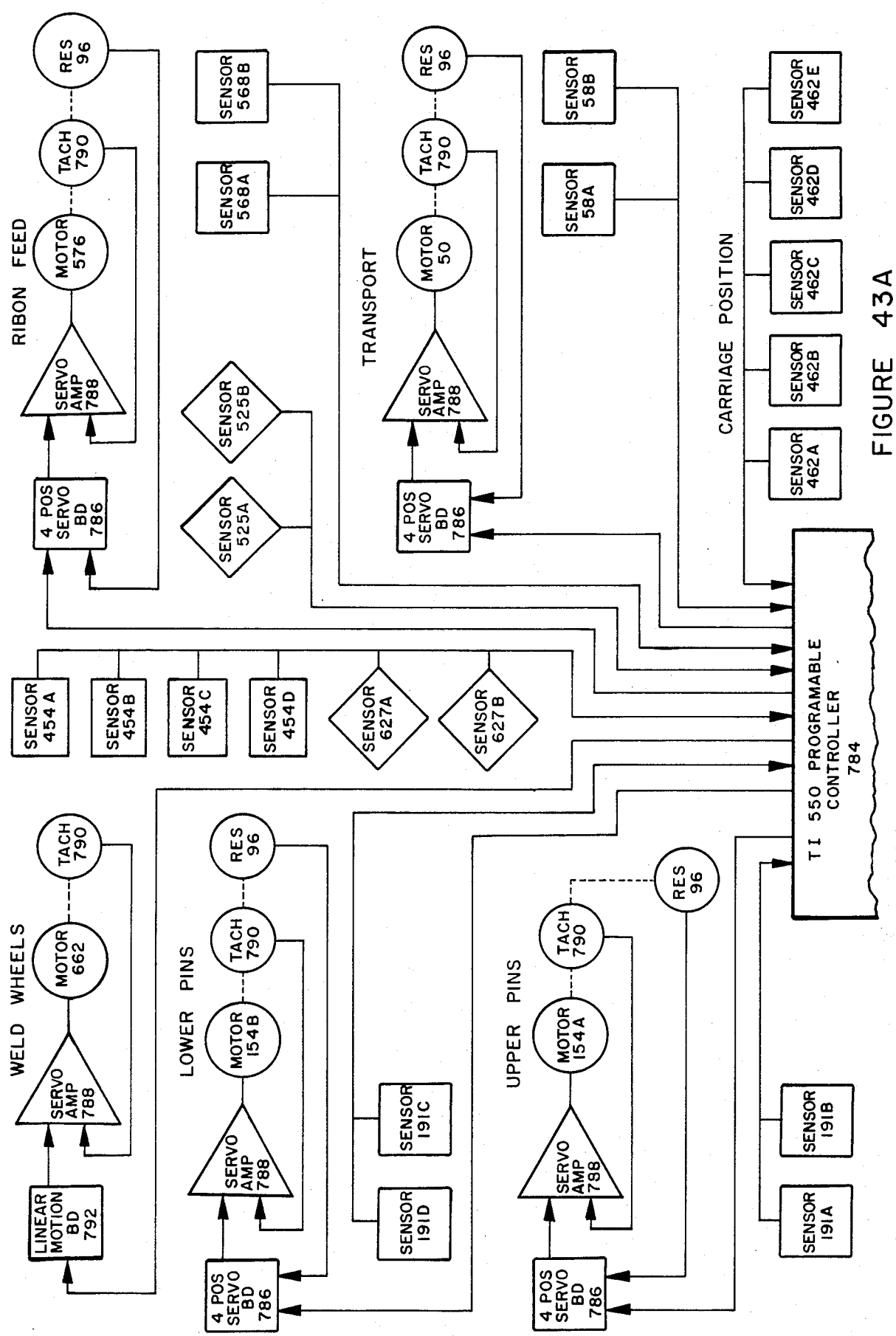
FIG. 43A is the upper portion of the electrical block diagram of the machine electrical.
Figure 43:
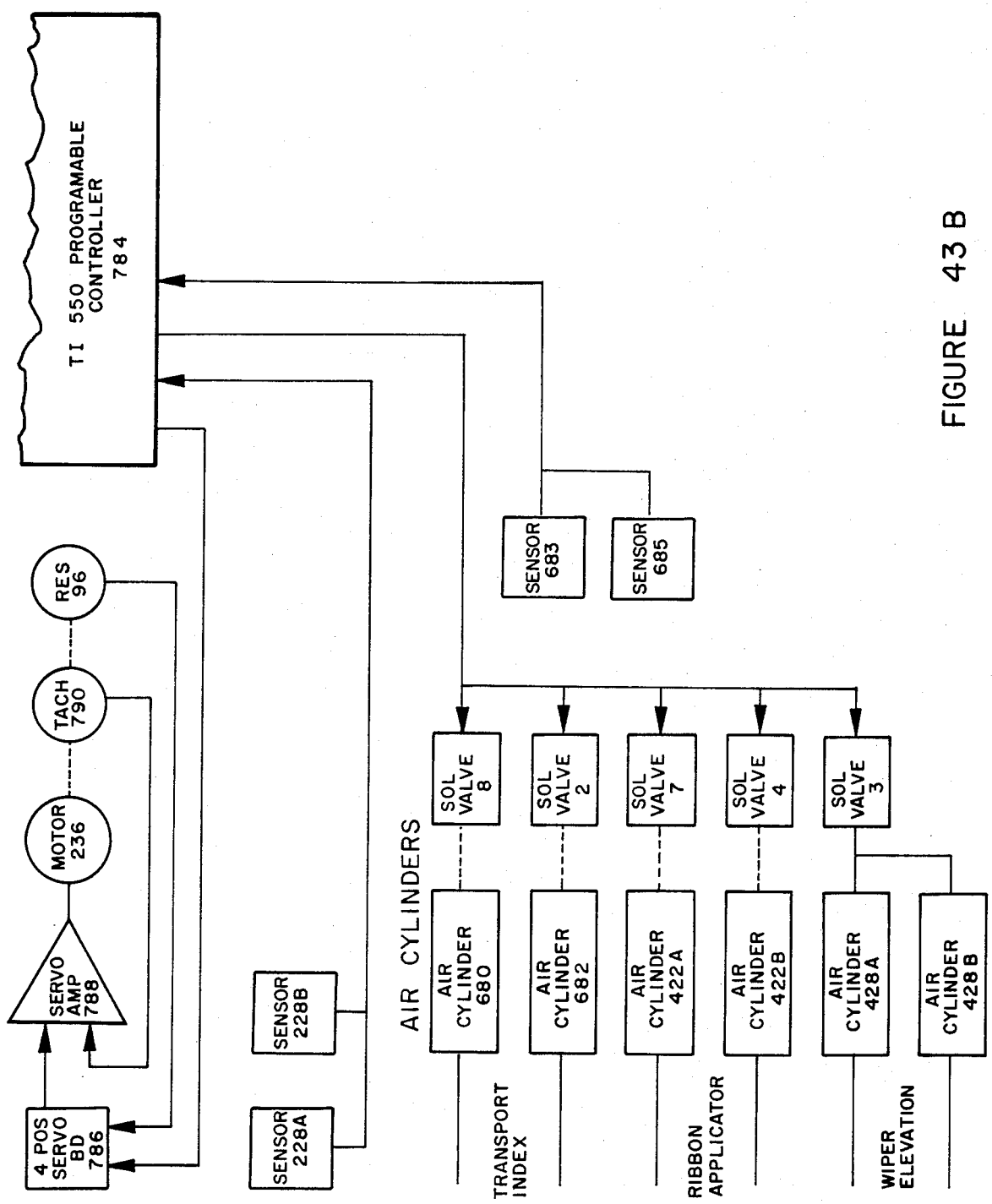
FIG. 43B is the lower portion of the electrical block diagram of the machine electrical.

Referring now specifically to the electrical block diagram of FIG. 43. The operation of the net honeycomb core machine 10 of the invention is operated by a central programmable controller 784. The controller may be a Texas Instruments 550 or equivalent. The controller is programmed to operate the various motors of the invention in a proper sequence so as to prevent any interactions between the various functions of the motors as they operate. For transport movement, the controller 784 sends signals to a four positions servo board 786 which supplies a signal to a servo amplifier. 788 which supplies drive voltage to the motor 50. A tachometer 790 which is a part of the motor and a feed back resolver 96 control the signal output from the four position servo board 786 and the voltage from servo amplifier 788 to maintain the proper speed of motor 50. Sensors 58A and 58B check that the transport drive mechanism is at the proper stop position prior to changing direction. The positions location sensors 462A-462E check that the transport is at a described position (1 of 5) as commanded by the controller.

Sensors 191D and 191C check the position of the lower weld electrode assembly's up or down position. and sensors 191A and 191B check the position of the upper weld electrode assembly's up or down position. The servo boards 786, Servo Amplifier 788, tachometer 790 and resolver 96 operate in the same manner as hereinbefore discussed.

The operation of the wheel weld electrodes 378 is through the operation of motor 662. Sensors 454A-454D and sensors 627A and 627B through the controller 784 instruct the controller in the motor operation and weld current application. Sensor 454A senses that the weld wheel assemblies are in a proper position to initiate weld current. Sensor 454B senses when the wheels of the weld wheel assemblies are approaching the ribbon and signals the controller to slow wheel movement to weld speed. Sensor 454C senses the weld wheels when the weld wheel assemblies are in their full deployed inward position indicating weld cycle complete. Sensor 454D senses the weld wheel assemblies when in a full non-weld outward position. The command signals from the controller are fed into a linear motion circuit 792 and through a servo amplifier 788 which supplies voltage to the motor 790. A tachometer 790 associated with the motor monitors motor speed.

The shuttling of the upper and lower weld electrodes simultaneously, one in front of the other is accomplished by the operation of motor 236. The motor control is from sensors 228A and 228B via the controller. Sensors 228A and 228B varify that the shuttle has reached its right or left positions. The motor 236 operates by voltage and speed control as hereinbefore discussed. Ribbon feed motor 576 operates in the same manner as the other motors by sensors 568A and 568B which check that the ribbon feed mechanism is in its right or left condition and sensors 525A and 525B check that the ribbon feed mechanism has shifted from right or left positions.

The transport location indexing is accomplished by the operation of a cylinder 680 and 682 operated by solonoids SOL 8 and SOL 2 respectively.

The ribbon application is controlled by solonoids SOL 4 and SOL 7. These solonoid valves operate air cylinder 429B and 429C respectively. The air cylinders rotate foil wipers 488 so that the tapered or tail end follows the direction of transport movement. In FIG. 26 the foil wipers are positioned for travel toward the left of the Figure.

Air cylinders 428 operate in the same manner of cylinders 429. Cylinders 428 left the foil wipers and apply pressure against the upper and lower weld electrodes.

All of the motor and tachometer combinations used are Electro Craft model 0723-32-018 or equivalent.

The servo amplifiers are all Westamp model A611 or equivalent.

The linear motor board is a model E518-206 manufactured by ROHR or equivalent.

The resolvers are Kearfott model 050-88-CR4109 5002 or equivalent.

Sensors 454A-454D, 191A-191D, 462A-462E, 58A and 58B, 568A and 568B, 683, and 685 are JMF model V60596 or equivalent.

Sensors 627A, 627B, 525A and 525B, are model No. 5322-3 by Skan-A-Matic or equivalent.

The transport installation is comprised of two weld wheel assemblies, a spreader assembly, and part of the transport index assembly 14 (see the various Figures). The two weld wheel assemblies (see FIGS. 1, 2, 3, 5, 25, 36 and 37) are mounted on the inside of the rectangular transport frame (see FIG. 34) one above the other. There are nine weld wheel head assemblies 378 in each weld wheel assembly. Each wheel head assembly consists of a wheel 386 mounted on a carrier 387 which is attached to the wheel mount 385. Pressure is exerted against the carrier 387 by a pneumatic cylinder 396 mounted on the upper portion of the wheel mount 385. An electrical cable 394 from the carrier assembly is attached to the aft end of the carrier.

The weld wheel assemblies are driven by a D.C. servo motor 662 mounted at the top of the transport, and are moved into the weld position by cam follower links 628. The cam follower links are mounted between pivotal side mounts 604. The cam follower allows the weld wheels to retract without passing over the ribbon foil a second time. This permits continuous rotation of the weld wheels 386, which presents a new weld wheel surface for each weld operation. The weld assemblies weld foil to foil at the predetermined weld stations as the transport moves laterally.

The stripper assembly (see FIGS. 8A and 8B) consists of upper and lower combs 120 which are attached at each end of a slide mount 102. Mounted on the comb carrier 118 are five combs 120. The comb carriers 118 are then mounted to the side mount 114 which are attached to the mainframe assembly. Attached to the surface of the slide mount is a delrin pad 112, detent rail 110, and two slides 106. Seated in the slides is a slide rail 122 upon which is mounted a foil clamp 126 and a rocker assembly 132. Attached to the rocker assembly is a roller follower 148 which rests in a slot in the detent rail. When the slide actuator lever of the spreader assembly contacts the posts of the rocker, the roller follower is forced up out of the slot, moving the rocker post up, engaging the slide actuator lever and forcing the slide rail to the outer limits of the slides.

As the spreader moves to the limit of its lateral movement, it lies ribbon foil along the delrin pad 112, then reverses direction and moves toward the next weld position, pulling the slide rail 122 along with it. The foil clamp 126 engages the foil, the roller follower 148 slips into the slot 128, and the rocker post releases the slide actuator lever. When the weld assemblies have completed the machine cycle and the weld finger assemblies are moved up or down by action of D.C. servo motors 154 and associated connecting rod means, the upper and lower comb assemblies hold the core honeycomb in place.

The transport assembly operates by an electrical pneumatic and a spring operated control device that enables the transport to reverse direction after the completion of the welds at the ends of the main frame travel or turnaround positions; and locks the transport and weld assemblies into each weld position as the transport moves through a machine cycle.

The transport assembly consists of a transport drive bar assembly, transport index drive, rocker arm index assembly, reducer 48 and D.C. servo motor 50. The transport drive bar assembly is located at the top of the mainframe, next to the transport, and consists of an index plate assembly 66, index rail 84, detent rail 82, two bearing ways 76, and four bearing 78 and bearing carriers 80. The index plate assembly 66 is attached to the mainframe by the bearings 78 which ride on the bearing ways 76. The index and detent rails are attached to the frame of the mainframe.

The index plate 68 provides slots for the rocker arm index assembly 694 to lock the transport into each weld position and to reverse the direction of the transport.

The transport index drive is located on the upper left, front portion of the mainframe. The transport index drive consists of a D.C. servo motor 50, coupling 84, reducer 48, crank arm 52, cam follower interupter disk 56, and sensors 58. The D.C. servo motor drives the reducer which moves the crank arm and attached cam follower 64. This action drives the index plate 68. The interupter disk 56 and sensors 58A and 58B indicate whether the transport is moving left or right. The transport index drive is attached by screw means to the mainframe by bracket 62. The rocker arm index assembly, attached to the upper beam of the transport installation, is comprised of ball transfer housing 722, rocker arm assembly 644 and pneumatic cylinders 680 and 682. The ball transfer housing 722 and 724 is mounted on the front of the rocker arm index assembly and consists of two heavy duty springs 730, six ⅜ inch diameter steel balls 728 and two detent plungers 706. Attached to the end of each detent plunger is a cam follower, one of which rides from slot to slot on the upper index rail when the transport is moving to the right, and one which rides from slot to slot on the lower detent rail when the transport is moving to the left. The detent plungers are actuated by the cam follower mounted on a rocker arm of the rocker arm assembly. The rocker arm detent plungers are actuated by the cam follower mounted on a rocker arm of the rocker arm assembly. The rocker arm assembly 694, which consists of three rocker arms 696 left/right and 692 and attached cam followers 698 left and right and 702, is actuated, by a pair of pneumatic cylinders 680 and 682 respectively. When the transport changes direction, the cylinder for the opposite direction is activated and causes the rocker arm assembly to pivot, translating the load, via the springs and steel balls, from one detent plunger to the other. This removes one detent plunger cam follower from contact with the index or detent rail and permits the other detent plunger cam follower to engage the index or detent rail. Sensors 683 and 685 check the positions of cylinders 680 and 682.

Upon completion of a weld cycle, the controller initiates the transport movement sequence by sending a signal to the rocker arm assembly. The rocker arm 694 pivots, the cam follower 698 attached to the rocker arm moves out of the slot in the index plate 68 and the index plate moves laterally so that a new index slot is presented to the rocker arm cam follower 648. As the transport then moves to the next weld position the detent plunger cam follower is forced out of the slot in the index or detent rail and rides along the rail to the slot to the next weld position.

When the weld wheel assemblies complete the welds in one direction of travel, the transport changes direction [turnaround]. The rocker arm assembly 644 is actuated by the pneumatic cylinder 680 or 682 causes the rocker arm cam follower to pivot out of the index slot in the index plate, onto an interference ramp which causes the transport to move laterally in its last direction approximately the length of one half the core cell width before it completes the turnaround, and into an index slot for the opposite direction.

The shuttle mechanism is composed of two rocker arms 166 driven by a pair of eccentrics 197 on a common shaft 196. On each end of the rocker arms are cam followers 220 which mate with slots formed by caps 168 and the extension of yoke 162 in each end of the upper and lower weld finger assemblies. The D.C. servo motor 236, attached through timing belt 234 at one end drives the shaft 196, there are two sensors 228A and 228B mounted on the common shaft of the motor drive indicate whether the shuttle drive has reached its right or left position.

Upon completion of the raising or lowering of the upper and lower weld finger assemblies, a signal is sent from the sensors 191A and 191D mounted on the weld finger assembly through the controller to the D.C. servo motor 236. This signal causes the motor to turn the common shaft 196, alternately moving the upper and lower weld wheel assemblies in and out. This action shuttles the core through the machine onto the runout table.

The cable carrier assembly consists of two pulley halves 312 attached to a bearing track 326 and separated by a spacer bar 322. There are two cable carrier assemblies, one for each weld wheel assembly. The cable carrier assembly transfers low voltage electric power from the transformer to the weld wheels. When the weld wheels assemblies are ready to weld, the sensor 454A on the weld wheel assembly sends a signal to the controller, which triggers the power to the transporters, then to the weld wheels, through the foil to the weld pins 272 and back to the transformers 364 via the ground straps.

The pneumatic system consists of three sub systems; a weld wheel, a foil adapter, and an index rocker arm. The air supply is filtered, regulated to 60 psi and lubricated. Solenoid SOL 1 one controls the air supply to the pneumatic system. The weld wheel pressure system consists of a manual valve, pressure switch and upper and lower weld wheel assembly pressure regulators. Each pressure regulator is connected, in parallel, to nine cylinders 396 which exert pressure on each weld wheel.

The foil finger rotation is controlled by solenoid SOL 4 [left] and solenoid SOL 7 [right]. The foil applicator is actuated by two cylinders 422A and 422B, one at each end of transport travel.

The foil applicator up and down movement is actuated by a dual pressure system. Low pressure for down and high pressure for up. Solenoid SOL 5 selects high or low pressure as required, solenoid SOL 3 selects for up. The foil applicator left is actuated by two cylinders, 428A and 428B located above and in the same general area as 422A and 422B.

The rocker arm index system is operated by the solenoid SOL 8 for right movement and solenoid SOL 2 for left movement. Solenoid SOL 6 is used to momentarily apply pressure to the system during the transport. Pressure is removed during the weld cycle.

Simply stated the action of the net core machine is as follows:

1. The shuttle is positioned at the far right with the ribbon applicator small end portion directed toward the left.
2. The upper fingers of the weld electrode assembly are positioned up and forward of the lower weld electrode assemblies weld fingers and the lower fingers are in an up position horizontally behind the upper weld electrode fingers.
3. The corrugated ribbon foil is now fed between the two ribbon applicators (between the pedals).
4. The shuttle is now moved toward the left side of the machine spreading the upper and lower weld electrode fingers apart and laying a layer of corrugated ribbon foil between the upper and lower weld electrode fingers.
5. As the shuttle proceeds toward the extreme left the spread upper weld electrode fingers move toward each other by spring bias locking the corrugated foil ribbon into place.
6. The movement of the shuttle to the far left has caused the ribbon applicators to rotate and the shuttle to be indexed one-half cell width to the left.
7. The weld wheel assemblies are then rotated from their stowed position to their weld position and weld current flows between the registrations of the two ribbon foil layers forming a weld therebetween.
8. The weld wheel assemblies then rotate to their stowed position and the machine moves in the same manner to the next weld station where the weld operation is repeated.
9. When the shuttle again reaches the extreme right it is indexed over to the right one-half of a cell width, the ribbon applicator is rotated, the lower weld electrodes move downward out of registry with the upper weld electrodes and the rear most lower weld electrodes are moved to the front and the upper weld electrodes are moved upward. The movement of the upper and lower electrodes advances the core toward the rear of the machine.
10. The transport continues to travel from weld station to weld station in both directions of travel in the above manner until a suitable length of honeycomb core is manufactured.

A manual control panel 44 is provided to enable the operator to operate the various motors and pneumatics selectively for initial ribbon foil insertion testing and repairing, etc. The controller is programmed so as to not allow any selected operation of the machine when damage to the machine will be encountered, i.e., the shuttle will not be allowed to translate when the weld wheel assemblies are in their weld positions, etc.

It is to be understood that changes and variations may be made without departing from the spirit and scope of the present invention as defined in the appended claims.

What is claimed is:

1. A machine for fabricating a continuous length of honeycomb core of discrete height and width from a continuous strip of pre-formed foil comprising:
   a mainframe assembly;
   first weld electrodes positioned along said mainframe assembly;
   a transport assembly carried by said mainframe assembly and translatable relative to said mainframe assembly along said first weld electrode;
   second weld electrodes carried by said transport assembly said second wall electrodes always addressing a portion of said first weld electrodes; and
   a foil positioning means carried by said transport assembly for laying a layer of a pre-formed foil between said first weld electrodes prior to said second weld electrodes contacting any portion of said addressed first weld electrodes whereby when two layers of said preformed foil are positioned adjacent to said first weld electrodes said two layers are welded together at discrete locations by current passing between said first and second weld electrodes through said layers.

2. The invention as defined in claim 1 wherein said first weld electrodes comprise upper and lower assemblies which are vertically displaceable relative to each other and said mainframe.

3. The invention as defined in claim 1 wherein said first weld electrodes comprise upper and lower electrode assemblies which are horizontally displaceable relative to each other.

4. The invention as defined in claim 1 wherein said first weld electrodes comprise upper and lower weld electrode assemblies which are horizontally and vertically displaceable relative to each other.

5. The invention as defined in claim 1 wherein translation means is provided to translate said transport assembly relative to said mainframe between discrete locations along the length of said layers of pre-formed foil.

6. The invention as defined in claim 5 wherein said translation means comprises a motor assembly and indexing means for translating said transport assembly between a plurality of discrete locations along said mainframe.

7. The invention as defined in claim 5 wherein said translating means repeatedly translate said transport assembly along said mainframe and said length of said layers of pre-formed foil and reverses the direction of said transport assembly travel at each side of said mainframe.

8. The invention as defined in claim 3 wherein the relative horizontal translation of said first weld electrodes are in opposing directions.

9. The invention as defined in claim 1 wherein said first weld electrodes are pins and said second weld electrodes are rotatable wheels.

10. The invention as defined in claim 9 wherein said wheels of said second weld electrodes rotate to a different weld position on each successive weld operation.

11. The invention as defined in claim 1 wherein said second weld electrodes are rotatable between a foil contacting position for welding and a spaced away from said foil position for transport assembly translation between weld operations.

12. The invention as defined in claim 1 wherein said second weld electrodes comprise upper and lower positive weld assemblies, each of said positive weld assemblies comprises a plurality of side-by-side spaced apart weld wheels, motor means associated with said second weld electrodes for rotating said weld electrode assemblies inward toward each other to a position where they are in contact with said pre-formed foil and outward away from each other to a transport assembly translate position.

13. The invention as defined in claim 12 wherein when said upper and lower weld electrode assemblies rotate in their weld position, said weld wheels roll along said preformed strip thereby addressing a different portion of said weld wheel surface during successive weld operations.

* * * * *